US008527996B2

(12) United States Patent  (10) Patent No.: US 8,527,996 B2
Murthy et al.  (45) Date of Patent: Sep. 3, 2013

(54) METHOD AND SYSTEM FOR PERFORMING A COMBINATION OF THROTTLING SERVER, THROTTLING NETWORK AND THROTTLING A DATA STORAGE DEVICE BY EMPLOYING FIRST, SECOND AND THIRD SINGLE ACTION TOOLS

(75) Inventors: Seshashayee Sankarshana Murthy, Yorktown Heights, NY (US); Ramani Ranjan Routray, San Jose, CA (US); Sandeep Madhav Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 12/683,512

(22) Filed: Jan. 7, 2010

(65) Prior Publication Data

US 2011/0167424 A1    Jul. 7, 2011

(51) Int. Cl.
 *G06F 9/46*    (2006.01)
(52) U.S. Cl.
 USPC .......................................................... 718/102
(58) Field of Classification Search
 USPC .......................................................... 718/102
 See application file for complete search history.

(56) References Cited

U.S. PATENT DOCUMENTS

| 7,103,797 | B1 | 9/2006 | Wahl et al. |
| 7,225,242 | B2 | 5/2007 | Cherian et al. |
| 2004/0236846 | A1 | 11/2004 | Alvarez et al. |
| 2006/0090163 | A1 | 4/2006 | Karisson et al. |
| 2006/0235991 | A1 | 10/2006 | Brown et al. |
| 2007/0112723 | A1 | 5/2007 | Alvarez et al. |
| 2008/0262890 | A1 | 10/2008 | Korupolu et al. |
| 2008/0263559 | A1 | 10/2008 | Das et al. |

OTHER PUBLICATIONS

L. Yin et al, "SMART: An Integrated Multi-Action Advisor for Storage Systems", USENIX Association, Annual Tech '06: 2006 USENIX Annual Technical Conference, pp. 229-242.
International Search Report, PCT/EP2010/070661, dated May 6, 2011.
Alvarez, G., et al, "Minerva: An Automated Resource Provisioning Tool for Large-Scale Storage Systems", ACM Transactions on Computer Systems vol. 19, No. 4, 2001, pp. 483-518.
Anderson, E., et al, "Hippodrome: Running Circles Around Storage Administration", Proceedings of Conference on File and Storage Technologies (FAST), Jan. 2002, pp. 175-188.

(Continued)

*Primary Examiner* — Thomas Lee
*Assistant Examiner* — Xuxing Chen
(74) *Attorney, Agent, or Firm* — Schmeiser, Olsen & Watts; Matthew Chung

(57) ABSTRACT

A method and system for throttling a plurality of operations of a plurality of applications that share a plurality of resources. A difference between observed and predicted workloads is computed. If the difference does not exceed a threshold, a multi-strategy finder operates in normal mode and applies a recursive greedy pruning process with a look-back and look-forward optimization to select actions for a final schedule of actions that improve the utility of a data storage system. If the difference exceeds the threshold, the multi-strategy finder operates in unexpected mode and applies a defensive action selection process to select actions for the final schedule. The selected actions are performed according to the final schedule and include throttling of a CPU, network, and/or storage.

29 Claims, 9 Drawing Sheets

(56) References Cited

OTHER PUBLICATIONS

Chamblis, D., "Performance Virtualization for Large-Scale Storage Systems", Proceedings of the 22nd Symposium on Reliable Distributed Systems, Oct. 2003, 109-118.

Dasgupta, K., et al, "QoSMig: Adaptive Rate-Controlled Migration of Bulk Data in Storage Systems", Proceedings of the 21st International Conference on Data Engineering, 2005, 12 pages.

Lu, Chenyang, et al, "Aqueduct: Online Data Migration with Performance Guarantees", Conference on File and Storage Technologies, Jan. 2002, 12 pages.

Lumb, C., et al, "Facade: Virtual Storage Devices with Performance Guarantees", 2nd Conference on File and Storage Technologies, Apr. 2003, pp. 131-144.

Uttamchandani, S., et al, "Chameleon: a Self-Evolving, fully-adaptive Resource Arbitrator for Storage Systems", Proceedings of USENIX Annual Technical Conference, Jun. 2005, 14 pages.

Ward, J., et al, "Appia: Automatic Storage Area Network Fabric Design", Conference on File and Storage Technologies, Apr. 2003, 10 pages.

Anderson, E., et al, "Ergastulum: An Approach to Solving the Workload and Device Configuration Problem", Tech. Rep. HPL-SSP-2001-5, HP Laboratories, Jul. 2001, pp. 1-25.

METHOD AND SYSTEM FOR PERFORMING A COMBINATION OF THROTTLING SERVER, THROTTLING NETWORK AND THROTTLING A DATA STORAGE DEVICE BY EMPLOYING FIRST, SECOND AND THIRD SINGLE ACTION TOOLS

FIELD OF THE INVENTION

The present invention relates to a data processing method and system for managing operations in a data center to enforce service level agreements, and more particularly to a technique for throttling different operations of applications that share resources.

BACKGROUND OF THE INVENTION

An enterprise data center environment has multiple applications that share server, network, and storage device resources. Most application deployments are preceded by a planning phase ensuring an initial resource allocation optimization based on the application service level agreement (SLA). With growing virtualization of server, network, and storage resources, there is continuous optimization in data center operations that may invalidate the initial resource allocation optimization. Application performance degradation is caused by interference from other applications sharing finite resources. Known throttling techniques to address application performance degradation provide insufficient coordination of different types of operation throttling. Furthermore, known throttling techniques fail to adequately take into account sub-workloads (e.g., data replication, data backup, and archiving) and workload dependencies. Thus, there exists a need to overcome at least one of the preceding deficiencies and limitations of the related art.

SUMMARY OF THE INVENTION

In one embodiment, the present invention provides a computer-implemented method of throttling a plurality of operations of a plurality of applications that share a plurality of resources. The method comprises:

receiving an observed workload that is observed on a data storage system and a predicted workload that is predicted to be on the data storage system;

computing a difference between the observed workload and the predicted workload;

determining whether or not the difference exceeds a predefined threshold for distinguishing between a first mode (normal mode) of a multi-strategy finder and a second mode (unexpected mode) of the multi-strategy finder;

a processor of a computer system determining a final schedule of one or more actions that improve a utility of the data storage system, wherein, if the difference does not exceed the predefined threshold, determining the final schedule includes applying a recursive greedy pruning-lookback-lookforward process to construct and prune each tree of a plurality of trees, wherein a result of the recursive greedy pruning-lookback-lookforward process applied to a tree of the plurality of trees is a first set of one or more actions occurring in a sub-window of a window of time for improving the utility, and wherein the first set of one or more actions is included in the final schedule, wherein, if the difference exceeds the predefined threshold, determining the final schedule includes applying a defensive action selection process that includes selecting and invoking a first action based on the first action being a least costly action of a plurality of candidate actions until a cumulative utility loss for continuing the first action exceeds a cost of invoking a next action, wherein the next action is a next least costly action of the plurality of candidate actions, and wherein the first action is included in the final schedule; and performing the one or more actions according to the final schedule, wherein the one or more actions includes a throttling action selected from the group consisting of: throttling a server, throttling a network, throttling a data storage device, and combinations thereof.

Systems, program products and processes for supporting computing infrastructure corresponding to the above-summarized methods are also described and claimed herein.

The present invention provides a technique for guaranteeing service level agreements by implementing multi-strategy throttling that may include a combination of central processing unit throttling, network throttling, and input/output throttling to provide end-to-end optimization.

DETAILED DESCRIPTION OF THE INVENTION

Overview

Embodiments of the present invention present an integrated server-storage-network throttling method and system that enforces run-time service level agreements (SLAs) and priorities associated with applications and that accounts for multiple sub-workloads (e.g., data replication for disaster recovery, data backup, and data archiving for compliance or for long-term data preservation of business intelligence). The throttling technique described herein may guarantee service level agreements (SLAs) for a highest priority application by implementing a multi-actuator selection strategy (a.k.a. multi-strategy throttling), where the operation of an application is throttled by a combination of central processing unit (CPU) throttling at a server, network throttling, and input/output (I/O) throttling to provide end-to-end optimization.

Further, the throttling technique described herein may use light-weight monitoring of individual devices to limit the overhead of monitoring the foreground application. Still further, embodiments of the present invention provide incremental active perturbation to determine the dependencies between application workloads. Finally, the optimization space provided by the throttling system described herein may recommend plan changes for sub-workloads (e.g., in terms of start of backup time widows and data mirroring batch sizes).

Multi-Strategy Throttling System

Figure 1:
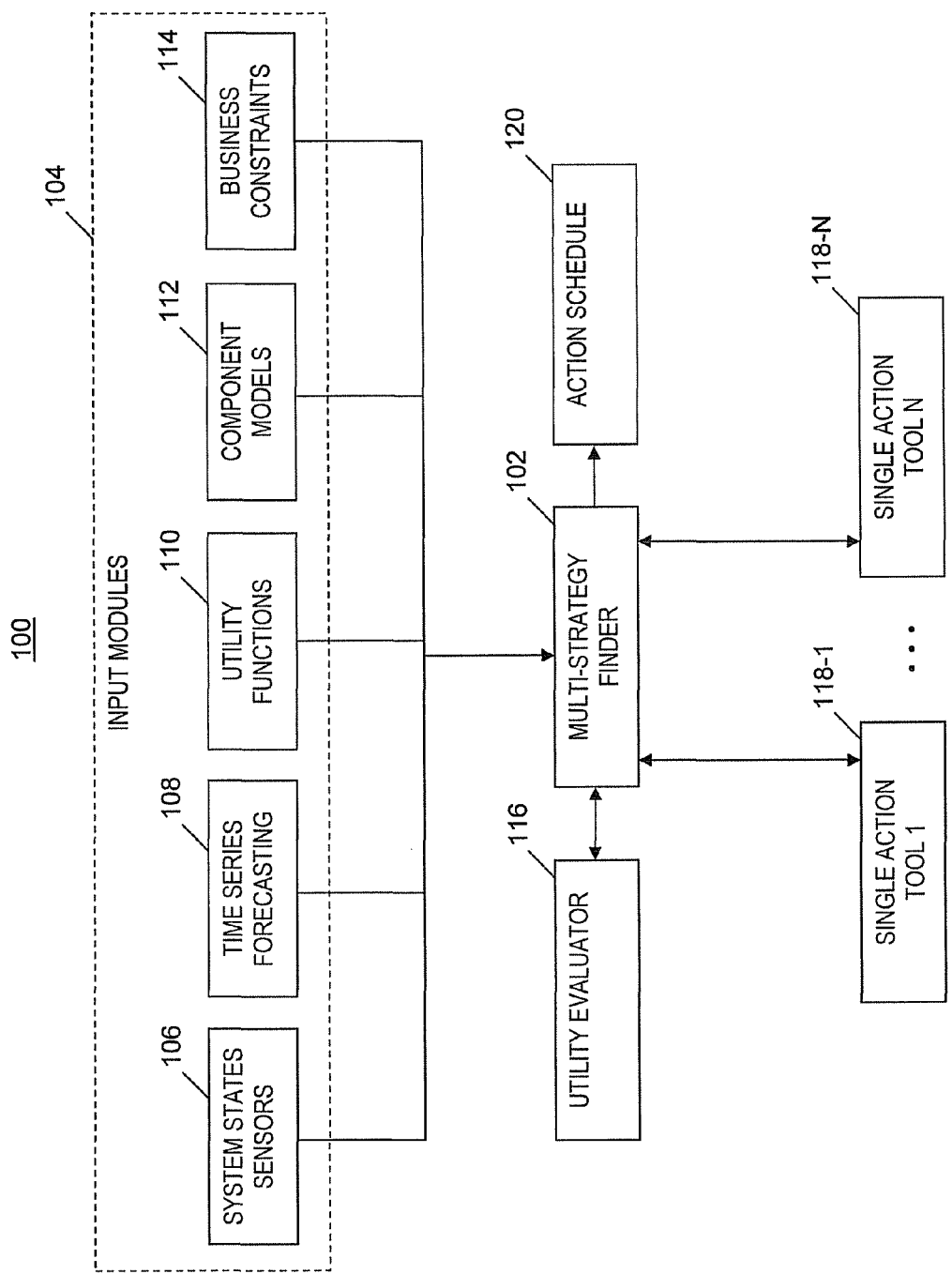
FIG. 1 is a block diagram of a system for throttling a plurality of operations of a plurality of applications sharing a plurality of resources, in accordance with embodiments of the present invention.

FIG. 1 is a block diagram of a system for throttling a plurality of operations of a plurality of applications sharing a plurality of resources, in accordance with embodiments of the present invention. System 100 includes a multi-strategy finder 102 that is implemented by a software program whose instructions are carried out by a computer system (see FIG. 7). In one embodiment, multi-strategy finder 102 provides multi-strategy throttling of application operations. Multi-strategy finder 102 receives input from input modules 104. Input modules 104 include system states sensors 106, time-series forecasting 108, utility functions 110, component models 112 and business constraints 114. A utility evaluator 116 determines an overall utility value (a.k.a. system utility) for system 100 and sends the system utility to multi-strategy finder 102. Each single action tool of single action tools 118-1, . . . , 118-N determines the optimal invocation parameters for a corrective action in a given system state and sends the determined invocation parameters to multi-strategy finder 102. Multi-strategy finder 102 generates an action schedule 120 that includes a schedule of corrective actions. System 100 can be deployed, for example, in file systems, storage resource management software and storage virtualization boxes.

The above-mentioned components of system 100 are described in more detail below:

Multi-Strategy Finder: Multi-strategy finder 102 improves storage system utility for a given optimization window and business-level constraints. Multi-strategy finder 102 interacts with the single action tools 118-1, . . . , 118-N and generates a time-based corrective action schedule (i.e., action schedule 120) with details of what corrective action(s) to invoke, when to invoke the corrective action(s) and how to invoke the corrective action(s). Generating the corrective action schedule 120 is accomplished by the multi-strategy finder 102 feeding the single-action tools 118-1, . . . , 118-N with different system states and collecting individual action options. The multi-strategy finder 102 then analyzes the selected corrective action invocation parameters using the utility evaluator 116. The multi-strategy finder 102 operates both reactively (i.e., in response to an SLO being violated), as well as proactively (i.e., before an SLO violation occurs).

In one embodiment, the multi-strategy finder 102 generates the corrective action schedule by performing the steps of an algorithm presented below:

Generate and analyze the current state $(S_0)$ as well as look-ahead states $(S_1, S_2, \ldots)$ according to the forecasted future.

Feed the system states along with the workload utility functions and performance models to the single action tools and collect their invocation options.

Analyze the cost-benefit of the action invocation options by using the utility evaluator 116 (see FIG. 1).

Prune the solution space and generate a schedule 120 (see FIG. 1) of what actions to invoke, when to invoke the actions, and how to invoke the actions.

The details of the algorithm implemented by the multi-strategy finder 102 are presented below in the section entitled MULTI-STRATEGY THROTTLING PROCESS.

System states: System state sensors 106 monitor the state S (a.k.a. system state) of system 100. System state sensors 106 may be implemented as hardware or software components. As used herein, the system state includes the run-time details of the system 100 and is defined as a triplet S=<C, W, M>, where C is the set of components in the system 100, W is the workloads, and M is the current mapping of workloads to the components.

Time Series Forecasting: Time series forecasting 108 determines values indicating time-series forecasting of workload request rates. The forecasting of future workload demands is based on extracting patterns and trends from historical data. The time series analysis of historic data performed by time-series forecasting 108 may utilize well-known approaches such as a neural network model or an autoregressive integrated moving average (ARIMA) model. The general form of time series functions is as follows:

$$y_{t+h} = g(X_t, \theta) + \epsilon_{t+h} \quad (1)$$

where: $y_{t+h}$ is the variable(s) vector to be forecast. The value t is the time when the forecast is made. $X_t$ are predictor variables, which usually include the observed and lagged values of $y_t$ until time t. $\theta$ is the vector of parameters of the function g and $\epsilon_{t+h}$ is the prediction error.

Utility Functions: Utility functions evaluate a degree of a user's satisfaction. For system 100, utility functions 110 associates workloads performance with a utility value, which reflects a user's degree of satisfaction. The utility function 110 for each workload can be (1) provided by administrators; (2) defined in terms of priority value and SLOs; or (3) defined by associating a monetary value (e.g., dollar value) to the level of service delivered (e.g., $1000/GB if the latency is less than 10 ms, otherwise $100/GB).

Component Models: A component model predicts values of a delivery metric as a function of workload characteristics. System 100 accommodates component models 112 for any system component. In particular, a component model 112 for a storage device takes the form: Response_time=c(req_size, req_rate, rw_ratio, random/sequential, cache_hit_rate), where req_size is the size of an I/O request, req_rate is the number of I/O requests received per unit of time (e.g., per second), rw_ratio is the ratio of read I/O requests to write I/O requests, random/sequential is the percentage of I/O requests that request random block access compared to sequential block access, and cache_hit_rate is the number of I/O requests served per unit of time from the cache instead of from the disk subsystem.

Because system 100 needs to explore a large candidate space in a short time, simulation-based approaches to creating component models 112 are not feasible due to the long prediction overhead. System 100 may utilize analytical models or black box approaches for creating component models 112. In one embodiment, a regression-based approach is used to boot-strap the component models and refine the models continuously at run-time.

Business constraints: Business constraints 114 include specifications for administrator-defined business-level constraints (e.g., budget constraints and optimization window) and service level objectives (SLOs).

Utility Evaluator: Utility evaluator 116 calculates the overall utility value delivered by a storage system in a given system state. Utility evaluator 116 may use component models 112 to interpolate the I/O performance values, which in turn map to the utility delivered to the workloads.

In one embodiment, the calculation of the overall utility value involves obtaining the access characteristics of each workload and using the component models 112 to interpolate the average response-time of each workload.

In one embodiment, the utility evaluator 116 uses the throughput and response-time for each workload to calculate the utility value delivered by the storage system:

$$U_{sys} = \sum_{j=1}^{N} UF_j(Thru_j Lat_j) \quad (2)$$

where N is the total number of workloads, $UF_j$ is the utility function of workload j, with throughput $Thru_j$ and latency $Lat_j$.

In addition, for any given workload demands $D_j$, the system maximum utility value $UMax_{sys}$ is defined as the "ideal" maximum utility value if the requests for all workloads are satisfied. Utility loss $UL_{sys}$ is the difference between the maximum utility value and the current system utility value. The system maximum utility value and the utility loss may be calculated as follows:

$$UMax_{sys} = \sum_{j=1}^{N} UF_j(D_j, SLO_{lat_j}) \quad (3)$$

$$UL_{sys} = UMax_{sys} - U_{sys}$$

where the $SLO_{lat_j}$ is the latency requirement of workload j. In addition, as used herein, cumulative utility value for a given time window is defined as the sum of the utility value across the given time window.

Single action tools: Single action tools 118-1, ..., 118-N may leverage existing tools for individual throttling tools that decide throttling at different points in the invocation path (i.e., CPU throttling, network throttling, and storage throttling). The single action tools 118-1, ..., 118-N automate invocation of a single corrective action. Each of these single action tools may include the logic for deciding the action invocation parameter values, and an executor to enforce these parameters.

The single action tools 118-1, ..., 118-N take the system state from system states 106, performance models and utility functions 110 as input from the multi-strategy finder 102 and outputs the invocation parameter values of a corrective action. For example, in the case of migration, a single action tool decides the data to be migrated, the target location, and the migration speed. Every corrective action has a cost in terms of the resource or budget overhead and a benefit in terms of the improvement in the performance of the workloads. The action's invocation parameter values are used to determine the resulting performance of each workload and the corresponding utility value.

Multi-Strategy Throttling Process

Figure 2:
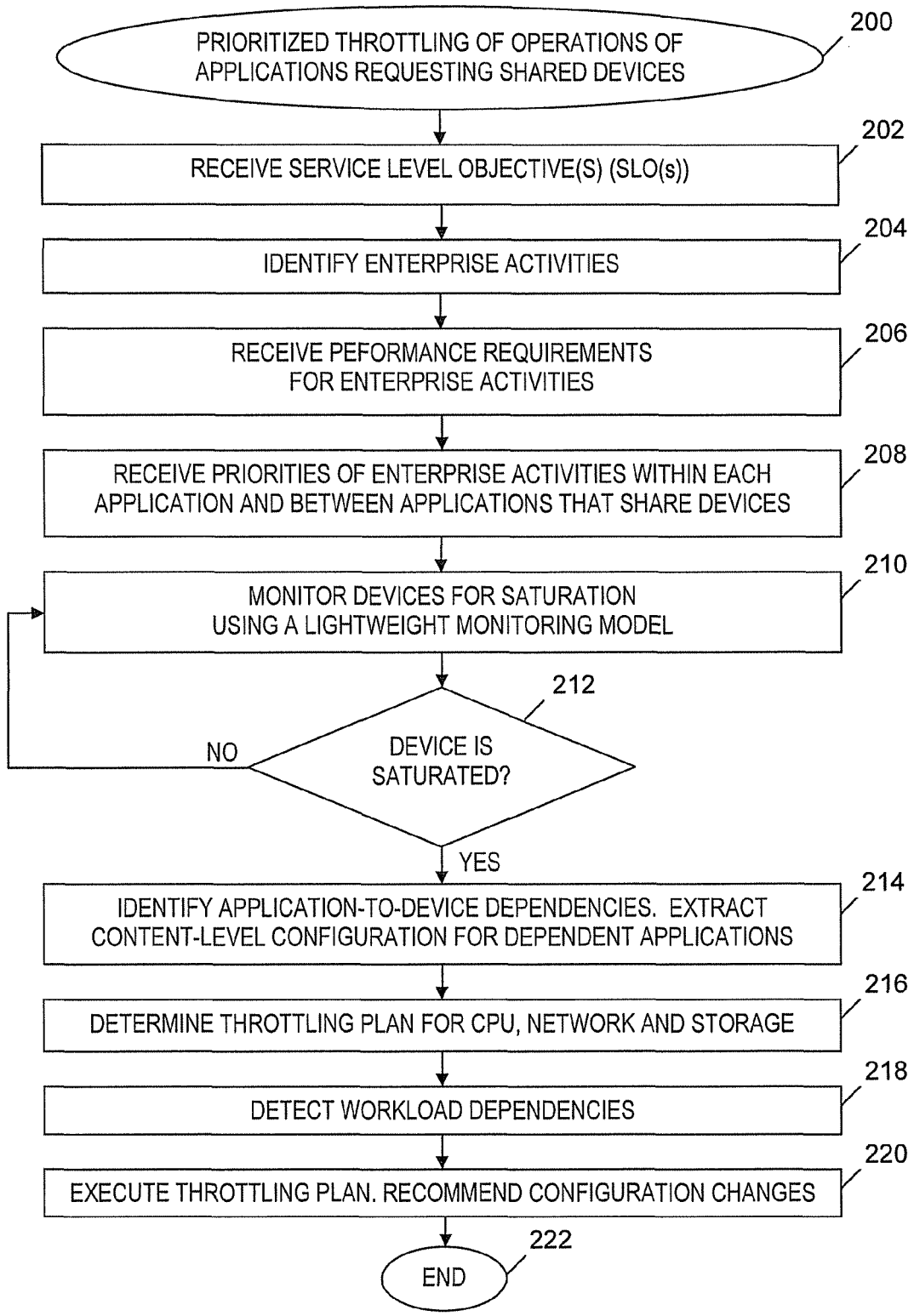
FIG. 2 is a flowchart of a process for throttling a plurality of operations of a plurality of applications sharing a plurality of resources, where the process is implemented in the system of FIG. 1, in accordance with embodiments of the present invention.

FIG. 2 is a flowchart of a process for throttling a plurality of operations of a plurality of applications sharing a plurality of resources, where the process is implemented in the system of FIG. 1, in accordance with embodiments of the present invention. The prioritized throttling of operations of applications requesting shared devices begins at step 200. In step 202, a computer system (e.g., computer system 700 in FIG. 7) implementing a multi-strategy throttling process receives SLOs associated with an enterprise. After activities (i.e., enterprise activities) associated with the enterprise are identified, the computer system receives the identifications of the enterprise activities in step 204. In step 206, the computer system receives performance requirements of the enterprise activities, where the performance requirements are based on the SLOs received in step 202. In step 208, the computer system receives priorities of enterprise activities within each software application and between software applications that share computing devices. The shared devices include one or more servers, a network, and one or more computer data storage devices.

In step 210, the computer system uses a light-weight monitoring model to monitor the shared devices. In step 212, if the computer system determines that none of the shared devices are saturated, then the process of FIG. 2 loops back to step 210 via the No branch of step 212, and the monitoring of the shared devices continues.

In step 212, if the computer system determines that one of the shared devices is saturated, then the Yes branch is taken and step 214 is performed. Although not shown in FIG. 2, step 214 is also performed if the computer system determines (e.g., in a daemon process) that a SLO received in step 202 is violated. In step 214, the computer system identifies application-to-device dependencies. Also in step 214, the computer system extracts content-level configuration (e.g., in terms of replication or archiving) for the dependent applications.

In step 216, the computer system determines a throttling plan for a CPU of a server, network, and a storage device in an invocation path of an application that requests the saturated device. Also in step 216, the computer system determines a sub-workload configuration for the application.

In step 218, the computer system applies selective active perturbation to detect workload dependencies.

In step 220, the computer system executes the throttling plan determined in step 216 and recommends configuration changes (e.g., changes to backup window time and data mirroring batch sizes). The process of FIG. 2 ends at step 222.

Figure 3:
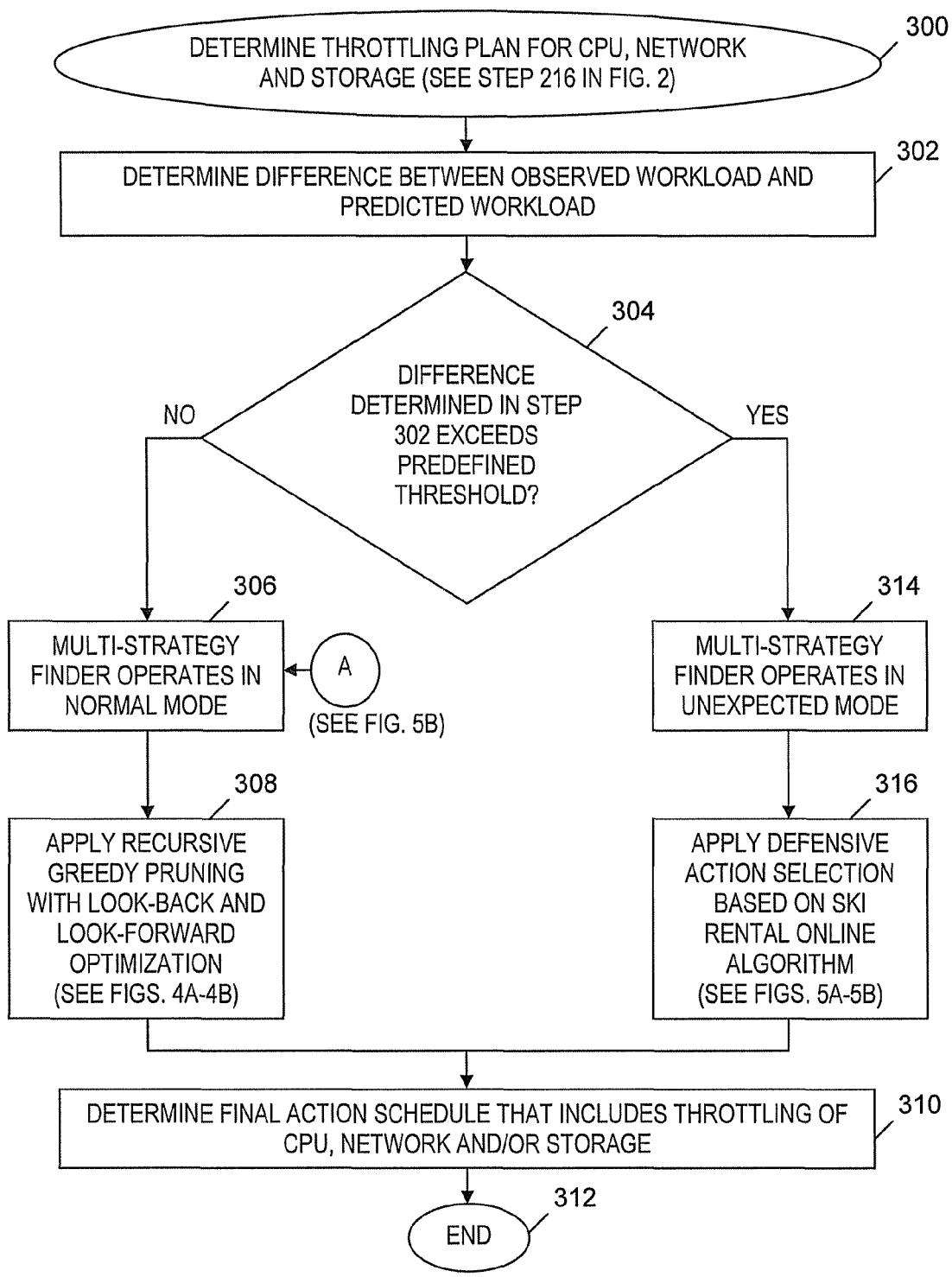
FIG. 3 is a flowchart of a process for determining a throttling plan included in the process of FIG. 2, in accordance with embodiments of the present invention.

FIG. 3 is a flowchart of a process for determining a throttling plan included in the process of FIG. 2, in accordance with embodiments of the present invention. The process of FIG. 3 is one embodiment of determining a throttling plan in step 216 in FIG. 2. The process of FIG. 3 begins at step 300. In step 302, multi-strategy finder 102 (see FIG. 1) determines a difference between an observed workload and a predicted workload. Step 304 is an inquiry step in which the multi-strategy finder 102 (see FIG. 1) determines whether the difference determined in step 302 exceeds a predefined threshold value. The threshold value may be defined by an administrator prior to the start of the process of FIG. 3.

If multi-strategy finder 102 (see FIG. 1) determines in step 304 that the difference determined in step 302 does not exceed the predefined threshold, then the No branch of step 304 is taken and step 306 is performed. The difference not exceeding the predefined threshold indicates that there is no unexpected variation between the observed and forecasted workloads. In step 306, multi-strategy finder 102 (see FIG. 1) starts operating in a first mode (i.e., the corrective action(s) in final action schedule 120 (see FIG. 1) are to be invoked proactively in response to forecasted workload growth). The first mode is referred to herein as the normal mode.

In the normal mode, multi-strategy finder 102 (see FIG. 1) uses an approach similar to the divide-and-conquer concept, which breaks the optimization window into smaller unequal sub-windows and uses a recursive greedy pruning with look-back and look-forward optimization approach (a.k.a. recursive greedy pruning-lookback-lookforward process) to select actions within each sub-window. The motivation of divide-and-conquer is to reduce the problem complexity and to treat the near-term fine-grained prediction periods differently from the long-term coarse-grained prediction periods. The action selection for each sub-window is performed in a sequential fashion, i.e., the resulting system state of one sub-window acts as the starting state for the next consecutive window. In step 308, multi-strategy finder 102 (see FIG. 1) applies a recursive greedy pruning algorithm with look-back and look-forward optimization (see the process in FIGS. 4A-4B) to select action(s) to be included in the action schedule 120 (see FIG. 1).

In step 310, multi-strategy finder 102 (see FIG. 1) determines a final action schedule 120 (see FIG. 1) that specifies what action(s) to perform, when to perform the action(s) and what invocation parameter values are used to perform the action(s). The action(s) specified in the final action schedule 120 (see FIG. 1) includes throttling a CPU, network, and/or a data storage device in the invocation path of the application that requests the saturated device (see the Yes branch of step 212 in FIG. 2). In one embodiment, multi-strategy finder 102 (see FIG. 1) selects a combination of actions to be included in the final action schedule so that overall system utility is improved or, equivalently, system utility loss is reduced. The process of FIG. 3 ends at step 312.

Returning to step 304, if multi-strategy finder 102 (see FIG. 1) determines that the difference determined in step 302 exceeds the predefined threshold value, then the Yes branch of step 304 is taken and step 314 is performed. Determining that the difference exceeds the predefined threshold value indicates an unexpected variation between the observed and forecasted workloads.

In step 314, multi-strategy finder 102 (see FIG. 1) starts operating in a second mode (i.e., the corrective action(s) in the final action schedule 120 (see FIG. 1) are to be invoked reactively in response to unexpected variations in the workloads). The second mode is referred to herein as the unexpected mode.

In the unexpected mode, multi-strategy finder 102 (see FIG. 1) selects actions defensively and tries to avoid invoking expensive actions because the excessive workload variation could cease soon after the action in invoked, making the overhead wasted. This attempt to avoid invoking expensive actions needs to be balanced with the potential risk of the high workload variation persisting and thus incurring continuous utility loss, which may add up over time. This analysis is formulated herein as a decision-making problem with an unknown future and an algorithm based on the "ski-rental" online algorithm is applied to select actions. In step 316, multi-strategy finder 102 (see FIG. 1) selects action(s) to be included in schedule 120 (see FIG. 1) by applying a defensive action selection algorithm (see the process of FIGS. 5A-5B), which is based on the "ski rental" (a.k.a. rent/buy) online algorithm (i.e., the break-even algorithm for solving the ski rental problem).

Although not shown in FIG. 3, multi-strategy finder 102 (see FIG. 1) continuously compares the observed workload values against the predicted workload values (see steps 302 and 304). If the difference is larger than the predefined threshold then the multi-strategy finder moves into the unexpected mode. While in the unexpected mode, the multi-strategy finder continuously updates its predictor function based on newly observed workload values. When the predicted workload values and observed workload values are close enough for a sufficiently long period, the multi-strategy finder transitions to the normal mode.
Normal Mode In real-world systems, it may be required to invoke more than one action concurrently. For example, if data migration is selected, it might be required to additionally throttle the lower priority workloads until all data are migrated. The multi-strategy finder 102 (see FIG. 1) uses look-back and look-forward optimizations (see steps 412-418 in FIG. 4B) to improve the action plan. The look-back and look-forward optimizations are with reference to the selected action's finish time $finish_i$. Look-back optimization seeks action options in the time window $[start_i, finish_i]$ (i.e., before the selected action finishes). Look-forward optimization examines possible actions in the window $[finish_i, end_i]$ (i.e., after the selected action finishes). Time $finish_i$ is chosen as the splitting point because (1) the system state is permanently changed after the action finishes, making the cost-benefit of action options changed and (2) any action scheduled before the selected action finishes needs to satisfy the above-mentioned no-conflict constraint. The look-back and look-forward optimizations each split the time window recursively and seek actions to improve the system utility further (see steps 412 and 416 in FIG. 4B). In the construction of the tree, the action candidates for look-back and look-forward optimizations are represented as left and right children respectively (see, e.g., the circles labeled 3 and 4 in tree 600 in FIG. 6) (see steps 414 and 418 in FIG. 4B). The process of greedy pruning with look-back and look-forward optimization is recursively performed to construct action schedule 120 (see FIG. 1) until the GreedyPrune function finds no action option.

The pseudocode for look-forward and look-back optimization is given in function Lookback and Lookforward, respectively, as presented below:

```
Function Lookback(i) {
    Foreach (Corrective_actions) {
        If(!(Conflict(Existing actions)) {
            Find action option in (start_i, finish_i);
            Add to Left_Children(i));
        }
    }
    GreedyPrune(Left_Children(i));
    If (Left_Children(i)!=NULL) {
        Lookback(Left_Children(i));
        Lookforward(Left Children(i));
    }
}
Function Lookforward(i) {
    Foreach (Corrective_actions) {
        Find action option in (finish_i, end_i);
        Add to Right_Children(i);
    }
    GreedyPrune(Right_Children(i))
    If (Right_Children(i)!=NULL) {
        Lookback(Right_Children(i));
        Lookforward(Right_Children(i));
    }
}
```

As described above, multi-strategy finder 102 (see FIG. 1) generates the schedule of corrective actions 120 (see FIG. 1) using a recursive approach (see the pseudocode for Function TreeSchedule presented below). The final action schedule for each sub-window is obtained by sorting the unpruned nodes (see, e.g., the circles labeled 2, 3 and 4 in tree 600 in FIG. 6) in the tree according to the node's action invocation time (i.e., $invoke_i$).

```
Function TreeSchedule( ) {
    Foreach (Corrective_actions) {
        Find action option in [T_k, T_{k+1}];
        Add to Children(root);
    }
    GreedyPrune(Children(root));
```

```
If (Children(root) !=NULL) {
    Lookback(Children(root));
    Lookforward(Children(root));
}
}
```

Finally, each sub-window generated in step 404 (see FIG. 4A) is processed sequentially. That is, the resulting system state of sub-window $[T_k, T_{k+1}]$ is the starting state of sub-window $[T_{k+1}, T_{k+2}]$, and the action schedules are composed into the final action schedule according to the action invocation time.

Figure 4A:
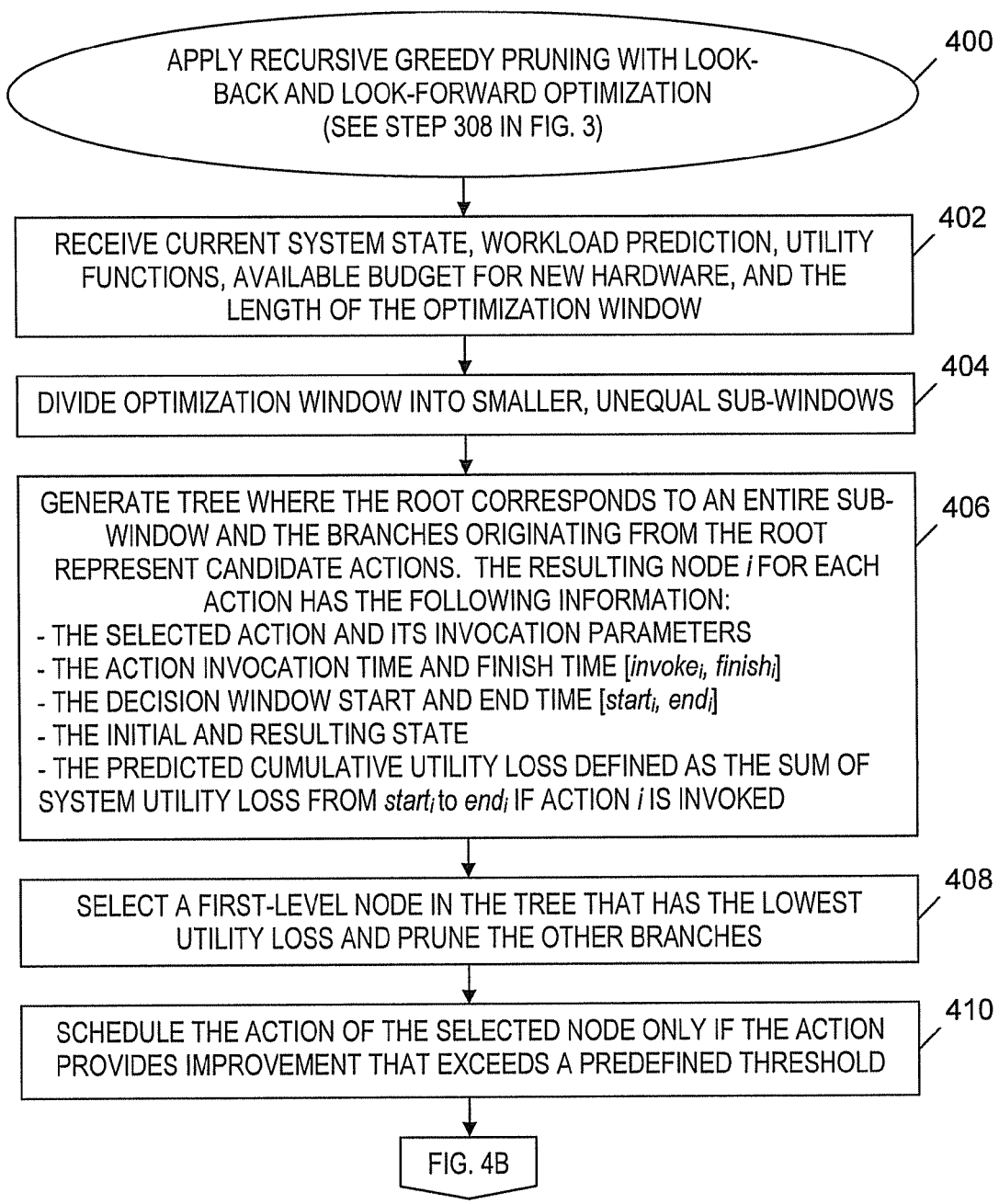
FIGS. 4A-4B depict a flowchart of a process for applying a recursive greedy pruning with look-back and look-forward optimization included in the process of FIG. 3, in accordance with embodiments of the present invention.
Figure 4B:
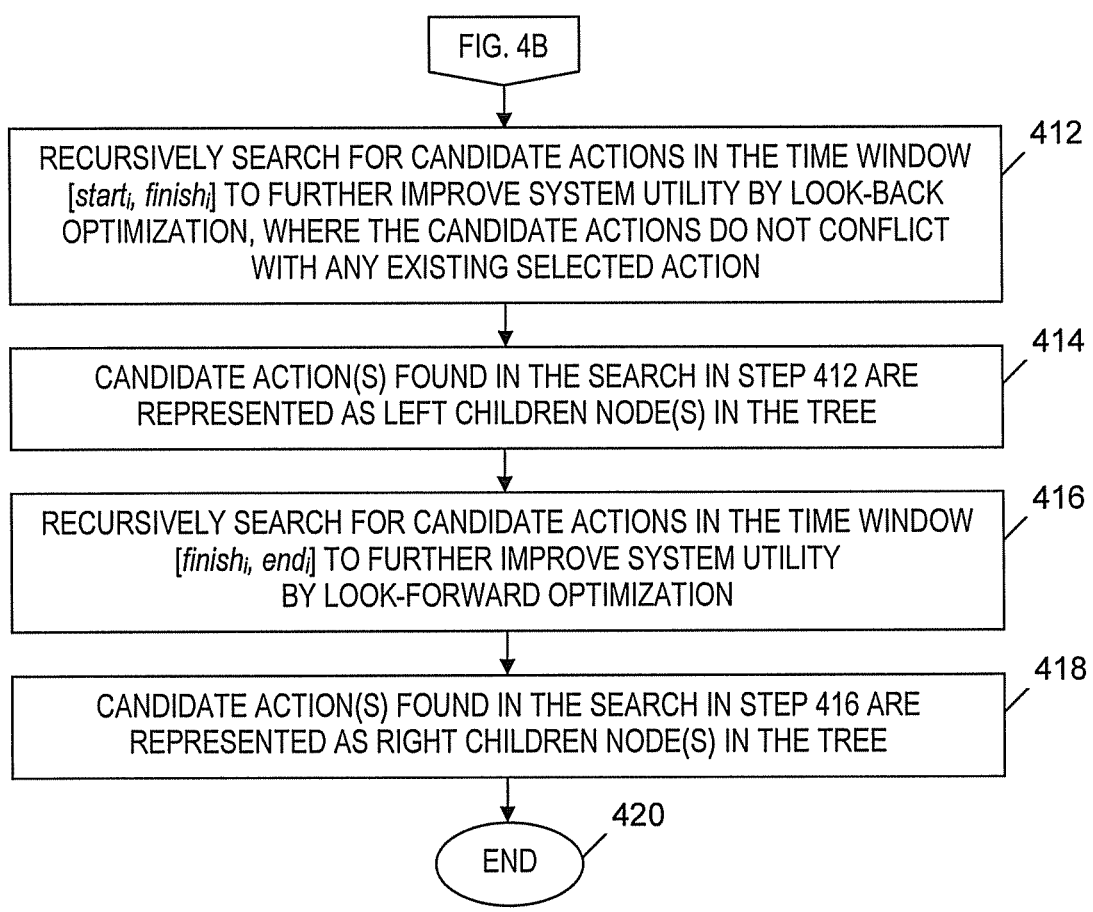

FIGS. 4A-4B depict a flowchart of a process for applying the above-mentioned recursive greedy pruning with look-back and look-forward optimization, which is included in the process of FIG. 3, in accordance with embodiments of the present invention. The process for applying a recursive greedy pruning with look-back and look-forward optimization is included in step 308 of FIG. 3 and starts at step 400 in FIG. 4A.

In step 402, multi-strategy finder 102 (see FIG. 1) receives the current system state from system states sensors 106 (see FIG. 1), a workload prediction from time series forecasting 108 (see FIG. 1), utility functions 110 (see FIG. 1), and available budget for new hardware from business constraints 114 (see FIG. 1), and the length of an optimization window of time (a.k.a. decision window).

In step 404, multi-strategy finder 102 (see FIG. 1) divides the optimization window to generate smaller, unequal sub-windows of time. For instance, a one year optimization window is split into sub-windows of 1 day, 1 month, and 1 year. The number and length of the sub-windows may be configured by an administrator.

Within each sub-window $[T_k, T_{k+1}]$ generated in step 404, the goal of the process of FIGS. 4A-4B is to find actions that maximize the cumulative system utility in the sub-window. Maximizing the cumulative system utility is formulated as a tree-construction algorithm as described below (see also FIG. 6).

In step 406, multi-strategy finder 102 (see FIG. 1) generates a tree where the root corresponds to an entire sub-window $[T_k, T_{k+1}]$ generated in step 404 and the branches originating from the root represent candidate corrective actions (i.e., action options) returned by single action tools 118-1, ..., 118-N (see FIG. 1). For m possible action options there will be m branches originating from the root of the tree. The resulting node i for each candidate corrective action has the following information:

The selected candidate action and its invocation parameters.

The action invocation time and finish time [invoke$_i$, finish$_i$],

The decision window start and end time [start$_i$, end$_i$]. For nodes originating from the root, the value of the decision window start and end time is $[T_k, T_{k+1}]$.

The initial state $S_i$ and resulting state $S_{i+1}$

The predicted cumulative utility loss UL$_i$, defined as the sum of system utility loss from start$_i$ to end$_i$ if action i is invoked.

In step 408, multi-strategy finder 102 (see FIG. 1) selects a first-level node (i.e., selects an action represented by the selected first-level node) in the tree, where the selected node represents the action has the lowest utility loss UL$_i$. Also in step 408, multi-strategy finder 102 (see FIG. 1) prunes the other m−1 branches (i.e., the branches that do not include the selected node) (see, e.g., the circles crossed out in tree 600 in FIG. 6). In step 410, the selected action represented by the selected node is included in schedule 120 (see FIG. 1) by multi-strategy finder 102 (see FIG. 1) only if the selected action provides an improvement in system utility that exceeds a predetermined threshold. The threshold is configurable such that a higher value leads to more aggressive pruning. The greedy pruning procedure included in step 408 is referred to as function Greedy Prune in the pseudocode presented below.

Step 412 in FIG. 4B follows step 410 in FIG. 4A. In step 412, multi-strategy finder 102 (see FIG. 1) recursively searches for candidate actions in the time window [start$_i$, finish$_i$] to further improve system utility by look-back optimization. The candidate actions considered in the search in step 412 satisfy a no-conflict restraint. That is, the candidate actions considered in the search do not conflict with any existing selected action (i.e., any action selected by step 408). As used herein, two actions are in conflict if one of the following conditions are true:

The two actions depend on the same resource.

Action j overlaps with an action k already in the schedule 120 (see FIG. 1), and action j violates the precondition for action k. For example, migration action 1 of moving data A from LUN$_1$ to LUN$_2$ will invalidate action 2 of moving data A from LUN$_1$ to LUN$_3$ because the precondition of action 2 that data A was on LUN$_1$ is no longer true.

In step 414, for the candidate action(s) found by the search in step 412 are represented as left children node(s) in the tree.

In step 416, multi-strategy finder 102 (see FIG. 1) recursively searches for candidate actions in the time window [finish$_i$, end$_i$] to further improve system utility by look-forward optimization.

In step 418, candidate action(s) found by the search in step 416 are represented as right children node(s) in the tree.

The process of FIGS. 4A-4B ends at step 420.

Unexpected Mode

Optimizing for the unexpected mode is challenging because it is difficult to predict the duration for which workload variation will persist. The multi-strategy finder 102 (see FIG. 1) uses a defensive action selection strategy similar to the one used in online decision making scenarios that address the "ski rental: to rent or to buy" problem. In the ski rental problem, there is a choice of whether to buy skis (e.g., at a cost of $150) or to rent skis (e.g., at a cost of $10 per ski trip) that has to be made without the knowledge of the future (i.e., without knowing how many times one will go skiing). If one skis less than 15 times, then renting is better; otherwise, buying is better. In the absence of the knowledge of the future, the commonly used strategy is the "to keep renting until the amount paid in renting equals the cost of buying, and then buy." This commonly-used strategy for the ski rental problem is always within a factor of two of the optimal, regardless of how many times one goes skiing, and is provably the best possible in the absence of knowledge about the future.

The multi-strategy finder 102 (see FIG. 1) follows an online strategy (i.e., a defensive action selection strategy) similar to the above-mentioned strategy for addressing the ski rental problem. Multi-strategy finder 102 (see FIG. 1) selects the least costly action until the cumulative utility loss for staying with that selected action exceeds the cost of invoking a next least expensive action. When multi-strategy finder 102 (see FIG. 1) is in the unexpected mode, the multi-strategy finder first finds all candidate action under the assumption that the system state and workload demands will remain the same. For each candidate A$_i$, the cost is initialized as the extra utility loss and hardware cost (if any) paid for the action invocation, as shown in Equation (4):

$$\text{Cost}(A_i) = \sum_{t=0}^{leadtime(A_i)} (U_{sys}(\text{no\_action}, t) - U_{sys}(A_i\_\text{ongoing})) + \text{HW\_Cost}(A_i) \quad (4)$$

In equation (4), $U_{sys}$(noaction,t) is the system utility value at time t if no corrective action is taken and $U_{sys}(A_i\_\text{ongoing}, t)$ is the system utility at time t if $A_i$ is ongoing. For example, for throttling, Cost($A_i$) will be zero because the leadtime is zero. For migration, the Cost($A_i$) is the total utility loss over leadtime($A_i$) due to allocating resources to move data around.

Multi-strategy finder 102 (see FIG. 1) selects the action with minimum cost and invokes it immediately. Over time, the cost of each action candidate (including both the selected one and unchosen ones) is updated continuously to reflect the utility loss experienced if $A_i$ had been invoked. Equation (5) gives the value of Cost($A_i$) after t intervals:

$$\text{Cost}(A_i) = \text{Cost}(A_i) + \sum_{j=0}^{t} UL(A_i, j) \quad (5)$$

This cost updating procedure continues until following situations happen:
  Another action k has a lower cost than the previously invoked action. Multi-strategy finder 102 (see FIG. 1) invokes action k immediately and continues the cost updating procedure. For example, if the system experiences utility loss with throttling, but has no utility loss after migration, the cost for the throttling action will continuously grow and the cost of migration will stay the same over time. At some point in time, the cost of throttling will exceed the cost of migration and the migration option will be invoked by then.
  System goes back to a good state for a period of time. The multi-strategy finder 102 (see FIG. 1) will stop the action selection procedure because the exception condition has ceased.
  The system collects enough new observations and transitions back to the normal mode.

Figure 5A:
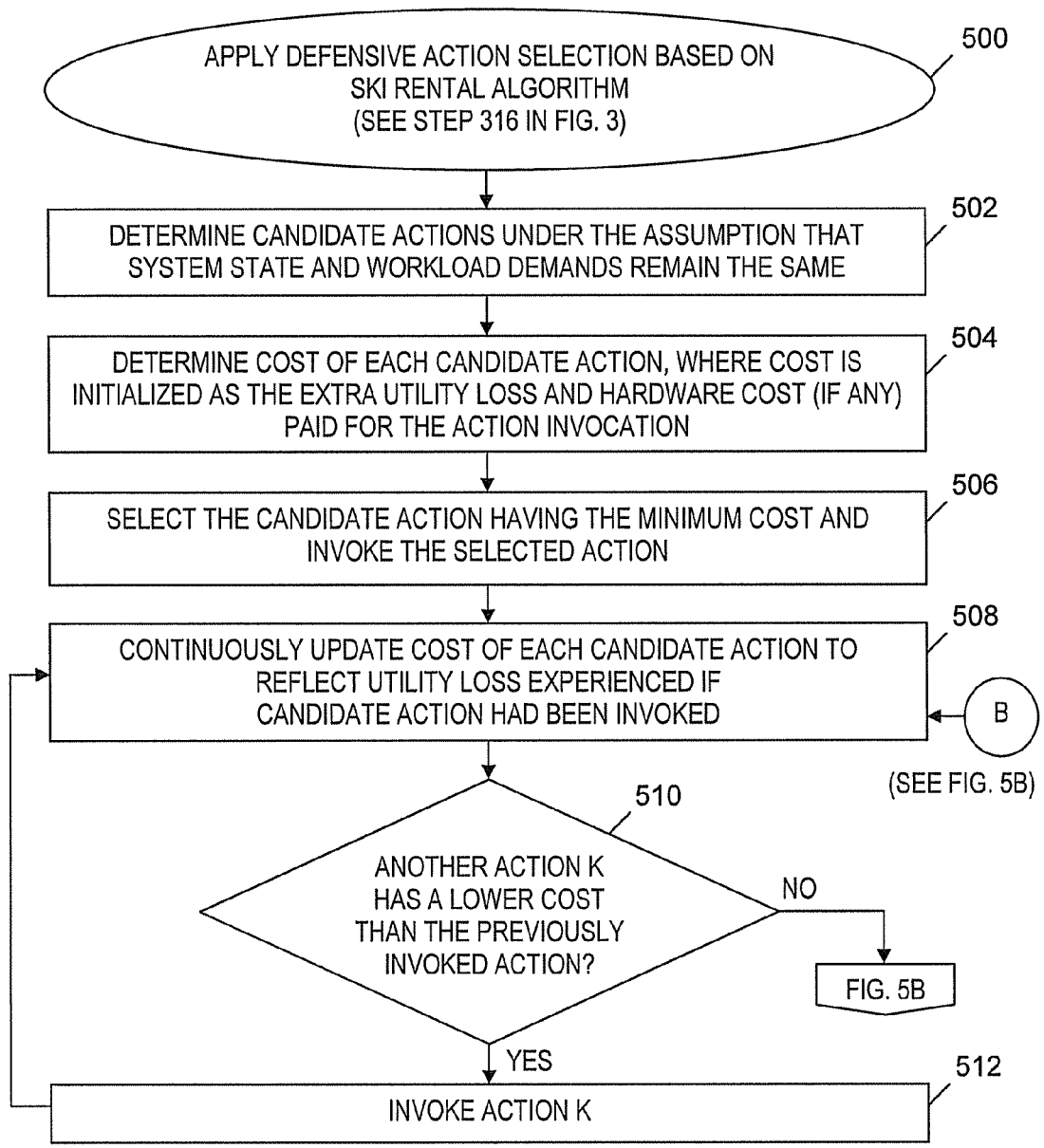
FIGS. 5A-5B depict a flowchart of a process for applying a defensive action selection algorithm included in the process of FIG. 3, in accordance with embodiments of the present invention.
Figure 5B:
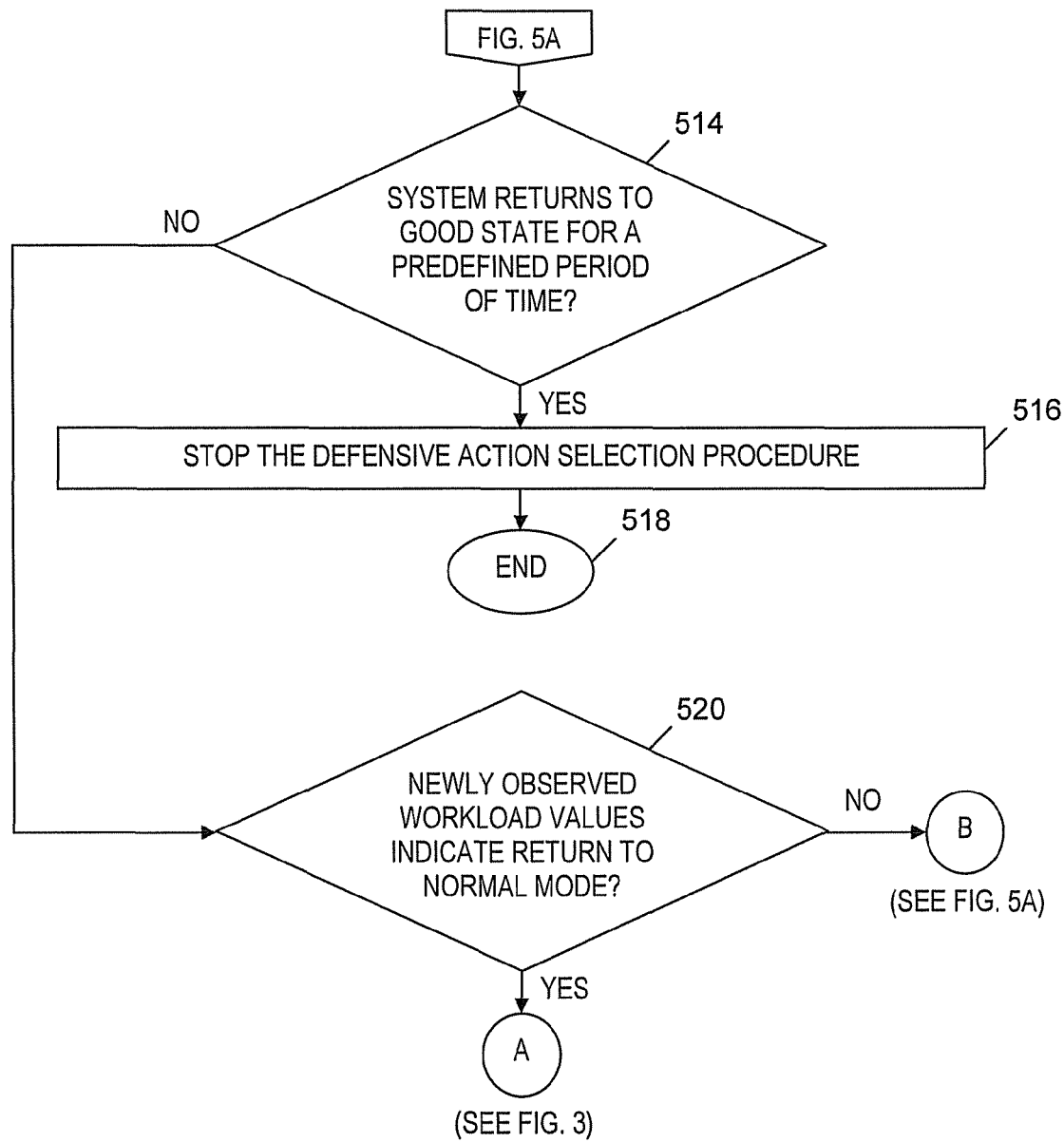

FIGS. 5A-5B depict a flowchart of a process for applying the above-mentioned defensive action selection algorithm included in the process of FIG. 3, in accordance with embodiments of the present invention. The process for applying a defensive action selection algorithm is included in step 316 (see FIG. 3) and starts at step 500 in FIG. 5A.

In step 502, multi-strategy finder 102 (see FIG. 1) determines candidate actions under the assumption that the system state and workload demands remain the same.

In step 504, multi-strategy finder 102 (see FIG. 1) determines a cost of each candidate action determined in step 502. Cost determined in step 504 is initialized as the extra utility loss and hardware cost (if any) paid for the action invocation.

In step 506, multi-strategy finder 102 (see FIG. 1) selects the candidate action having the minimum cost of the costs determined in step 504. Also, in step 506, multi-strategy finder 102 (see FIG. 1) invokes the selected candidate action.

In step 508, multi-strategy finder 102 (see FIG. 1) continuously updates the cost of each candidate action to reflect utility loss experienced if the candidate action had been invoked.

In inquiry step 510, multi-strategy finder 102 (see FIG. 1) determines whether another action k has a lower cost than the previously invoked action (i.e., the action invoked in step 506). If multi-strategy finder 102 (see FIG. 1) determines in step 510 that action k has a lower cost than the previously invoked action, then the Yes branch is taken and step 512 is performed. In step 512, multi-strategy finder 102 (see FIG. 1) invokes action k. Following step 512, the process loops back to step 508.

Returning to step 510, if multi-strategy finder 102 (see FIG. 1) determines that no other action has a lower cost than the previously invoked action (i.e., the action invoked in step 506), then the No branch is taken and step 514 in FIG. 5B is performed.

In inquiry step 514, multi-strategy finder 102 (see FIG. 1) determines whether or not the system returns to an acceptable state and remains in the acceptable state for at least a predefined period of time (i.e., the difference between observed and predicted workloads becomes less than the predefined threshold value and remains less than the predefined threshold value for a predefined period of time). If multi-strategy finder 102 (see FIG. 1) determines in step 514 that the system returns to the acceptable state for at least the predefined period of time, then the Yes branch of step 514 is taken and step 516 is performed. In step 516, multi-strategy finder 102 (see FIG. 1) stops the defensive action selection procedure. The process of FIGS. 5A-5B ends at step 518.

Returning to step 514, if multi-strategy finder 102 (see FIG. 1) determines that the system does not return to the acceptable state for at least the predefined period of time, then the No branch of step 514 is taken and step 520 is performed.

In inquiry step 520, multi-strategy finder 102 (see FIG. 1) determines whether or not newly observed workload values indicate that the multi-strategy finder should return to the normal mode. If multi-strategy finder 102 (see FIG. 1) determines in step 520 that newly observed workloads indicate a return to the normal mode, then the Yes branch of step 520 is taken and the process continues with step 306 in FIG. 3.

Otherwise, if multi-strategy finder 102 (see FIG. 1) determines in step 520 that newly observed workloads do not indicate a return to the normal mode, the No branch of step 520 is taken and the process loops back to step 508 in FIG. 5A.

Figure 6:
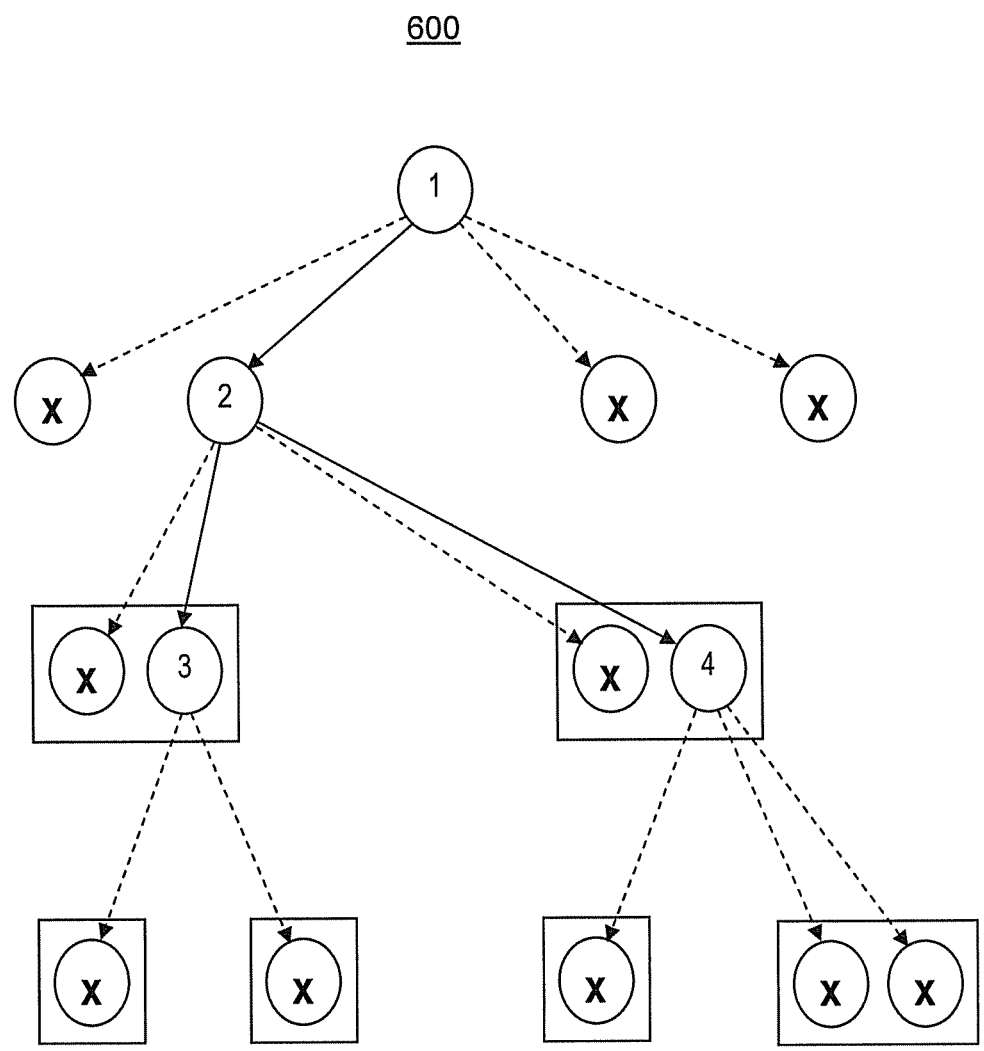
FIG. 6 depicts an example of an action schedule generation tree utilized in the process of FIGS. 4A-4B, in accordance with embodiments of the present invention.

FIG. 6 depicts an example of an action schedule generation tree 600 utilized in the process of FIGS. 4A-4B, in accordance with embodiments of the present invention. The root of the tree 600 is labeled "1" and corresponds to an entire sub-window generated in step 404 (see FIG. 4A). The pruning performed in step 408 (see FIG. 4A) is illustrated by the circles labeled "X" in the first level of tree 600 below the root. The node selected in step 408 (see FIG. 4A) is the circle labeled "2" in tree 600. Again, in the construction of the tree 600, the candidate actions for look-back and look-forward optimizations in steps 412-418 (see FIG. 4B) are represented as left and right children, respectively (see, e.g., the circles labeled 3 and 4 in tree 600) (see steps 414 and 418 in FIG. 4B). The final action schedule for each sub-window is obtained by sorting the actions represented by the unpruned nodes in tree 600 (i.e., the circles labeled 2, 3 and 4 in tree 600), according to each unpruned node's action invocation time (i.e., $invoke_j$).

Risk Modulation

Risk modulation deals with the future uncertainty and action invocation overhead. In the discussion above relative to FIG. 3, FIGS. 4A-4B and FIGS. 5A-5B, action selection was made based on the cumulative utility loss $UL_i$. The accuracy of $UL_i$ depends on the accuracy of future workload forecasting, performance prediction and cost-benefit effect estimation of actions. Inaccurate estimation of $UL_i$ may result in decisions leading to reduced overall utility. To account for the impact of inaccurate input information, risk modulation is performed on the $UL_i$ for each action option. Here, risk describes: (1) the probability that the utility gain of an action will be lost (in the future system-states) as a result of volatility in the workload time series functions (e.g., the demand for $W_1$ was expected to be 10K IOPS after 1 month, but it turns out to be 5K, making the utility improvement of buying new hardware wasted) and (2) the impact of making a wrong action decision (e.g., the impact of a wrong decision to migrate data when the system is 90% utilized is higher than that of when the system is 20% loaded).

There are several techniques for measuring risk. Actions for assigning storage resources among workloads are analogous to portfolio management in which funds are allocated to various company stocks. In economics and finance, the Value at Risk (VaR) is a technique used to estimate the probability of portfolio losses based on the statistical analysis of historical price trends and volatilities in trend prediction. In the context of the system described herein, VaR represents the probability with a 95% confidence, that the workload system will not grow in the future, making the action invocation unnecessary.

$$VaR(95\% \text{ confidence}) = -1.65\sigma \times \sqrt{T} \quad (6)$$

where, σ is the standard deviation of the time series request-rate predictions and T is the number of days in the future for which the risk estimate holds. For different sub-windows, the prediction standard deviation may be different (e.g., a near-term prediction is likely to be more precise than a long-term one).

The risk value $RF(A_i)$ of action i is calculated by:

$$RF(A_i) = -(1+\alpha)*VaR \quad (7)$$

where α reflects the risk factors of an individual action (based on its operational semantics) and is defined as follows:

$$\alpha_{thr} = 0$$

$$\alpha_{mig} = \frac{bytes\_moved}{total\_bytes\_on\_source} * Sys\_Utilization$$

$$\alpha_{hw} = \frac{hardware\_cost}{total\_budget} * (1 - Sys\_Utilization)$$

where Sys_Utilization is the system utilization when the action is invoked.

For each action option returned by the single action tools 118-1, ..., 118-N (see FIG. 1), the multi-strategy finder 102 (see FIG. 1) calculates the risk factor $RF(A_i)$ and scales the cumulative utility loss $UL_i$ according to Equation (8) and the action selection is performed based on the scaled $UL^*_i$ (For example, in the GreedyPrune function).

$$UL^*_i = (1 + RF(A_i)) \times UL_i \quad (8)$$

Computer System

Figure 7:
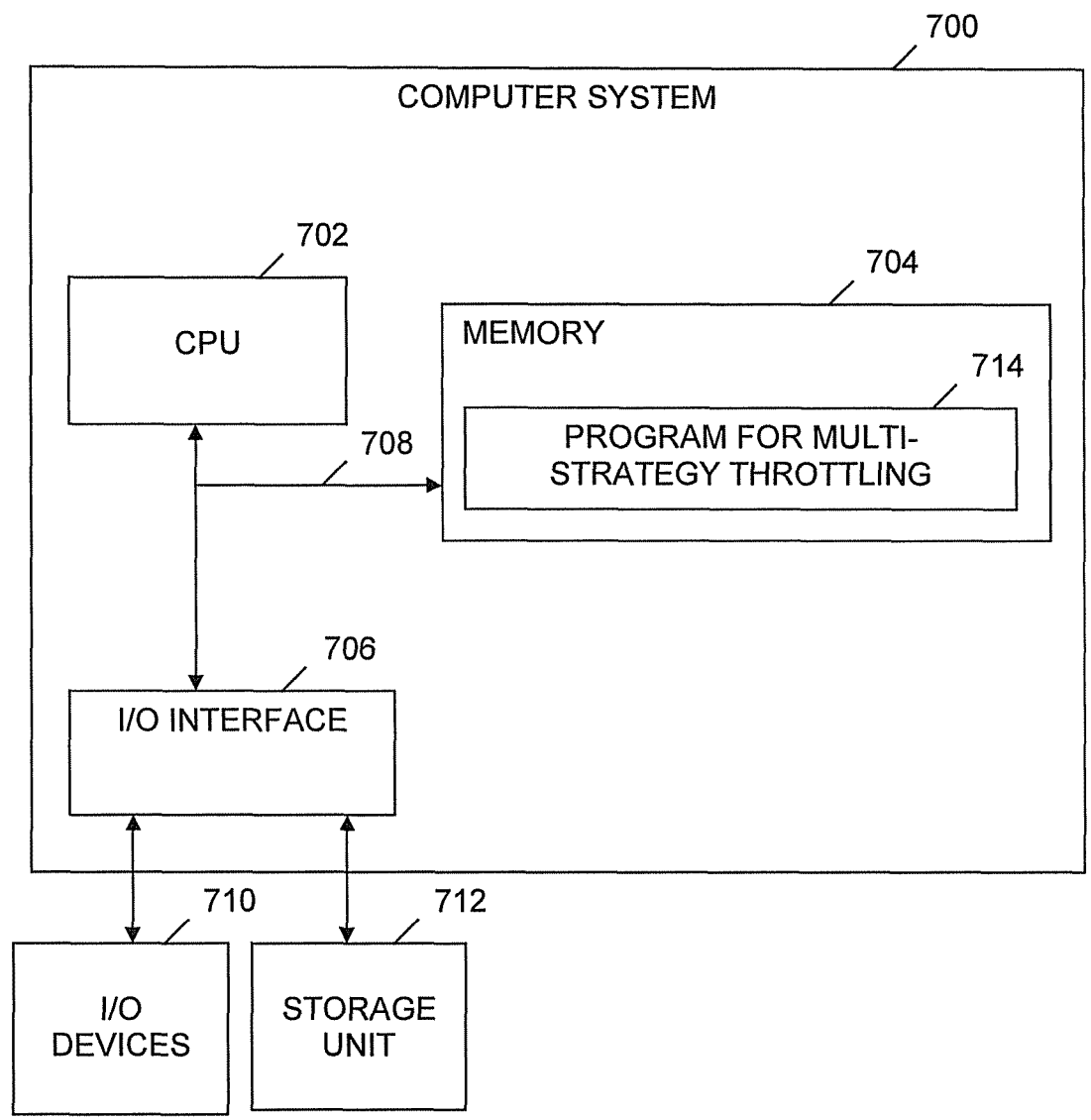
FIG. 7 is a computer system that includes the multi-strategy finder included in the system of FIG. 1 and that implements the processes of FIG. 2, FIG. 3, FIGS. 4A-4B and FIGS. 5A-5B, in accordance with embodiments of the present invention.

FIG. 7 is a computer system that includes the multi-strategy finder of the system of FIG. 1 and that implements the processes of FIG. 2, FIG. 3, FIGS. 4A-4B and FIGS. 5A-5B, in accordance with embodiments of the present invention. Computer system 700 generally comprises a central processing unit (CPU) 702, a memory 704, an I/O interface 706, and a bus 708. Further, computer system 700 is coupled to I/O devices 710 and a computer data storage unit 712. CPU 702 performs computation and control functions of computer system 700. CPU 702 may comprise a single processing unit, or be distributed across one or more processing units in one or more locations (e.g., on a client and server). In one embodiment, computer system 700 is carries out instructions of programs that implement one or more components of system 100 (see FIG. 1), including multi-strategy finder 102 (see FIG. 1).

Memory 704 may comprise any known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 700, and may comprise any type of transmission link, including electrical, optical, wireless, etc.

I/O interface 706 also allows computer system 700 to store and retrieve information (e.g., data or program instructions such as program code 714) from an auxiliary storage device such as computer data storage unit 712 or another computer data storage unit (not shown). Computer data storage unit 712 may comprise any known computer readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 may store computer program code 714 that provides the logic for multi-strategy throttling included in one or more of the processes in FIGS. 2, 3, 4A-4B and 5A-5B. In one embodiment, program code 714 is included in multi-strategy finder 102 (see FIG. 1). Further, memory 704 may include other systems not shown in FIG. 7, such as an operating system (e.g., Linux) that runs on CPU 702 and provides control of various components within and/or connected to computer system 700. In one embodiment, memory 704 stores program code that provides logic for utility evaluator 116. In one embodiment, memory 704 stores program code that provides logic for one or more single action tools 118-1, ..., 118-N (see FIG. 1).

Memory 704, storage unit 712, and/or one or more other computer data storage units (not shown) that are coupled to computer system 700 may store input received from input modules 104 (see FIG. 1).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 700). Furthermore, an embodiment of the present invention may take the form of a computer program product embodied in one or more computer readable medium(s) (e.g., memory 704 or computer data storage unit 712) having computer readable program code (e.g., program code 714) embodied or stored thereon.

Any combination of one or more computer readable medium(s) (e.g., memory 704 and computer data storage unit 712) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 714) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 714) embodied on a computer readable medium may be transmitted using any appropriate medium, including but not limited to wireless, wireline, optical fiber cable, RF, etc., or any suitable combination of the foregoing.

Computer program code (e.g., program code 714) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 700 or another computer system (not shown) having components analogous to the components of computer system 700 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIGS. 4A-4B, and FIGS. 5A-5B) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714). These computer program instructions may be provided to a processor (e.g., CPU 702) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 704 or computer data storage unit 712) that can direct a computer (e.g., computer system 700), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 700), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of throttling a plurality of operations of a plurality of applications that share a plurality of resources. Thus, an embodiment of the present invention discloses a process for supporting computer infrastructure, comprising integrating, hosting, maintaining and deploying computer-readable code (e.g., program code 714) into a computer system (e.g., computer system 700), wherein the code in combination with the computer system is capable of performing a process of throttling a plurality of operations of a plurality of applications that share a plurality of resources.

In another embodiment, the invention provides a business method that performs the process steps of the invention on a subscription, advertising and/or fee basis. That is, a service provider, such as a Solution Integrator, can offer to create, maintain, support, etc. a process of throttling a plurality of operations of a plurality of applications that share a plurality of resources. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, FIGS. 4A-4B and FIGS. 5A-5B and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 714), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of throttling a plurality of operations of a plurality of applications that share a plurality of resources, said method comprising:
   a computer system receiving an observed workload that is observed on a data storage system and a predicted workload that is predicted to be on said data storage system;
   said computer system computing a difference between said observed workload and said predicted workload;
   said computer system determining whether or not said difference exceeds a predefined threshold for distinguishing between a first mode (normal mode) of a multi-strategy finder and a second mode (unexpected mode) of said multi-strategy finder;
   said computer system determining a final schedule of a plurality of actions that improve a utility of said data storage system,
   wherein, in response to a result of said determining whether or not said difference exceeds said predefined threshold being said difference does not exceed said predefined threshold, said determining said final schedule includes applying a recursive greedy pruning-lookback-lookforward process to construct and prune each tree of a plurality of trees, wherein a result of said recursive greedy pruning-lookback-lookforward process applied to a tree of said plurality of trees is a first set of one or more actions occurring in a sub-window of a window of time for improving said utility, and wherein said first set of one or more actions is included in said final schedule,
   wherein, in response to said result of said determining whether or not said difference exceeds said predefined threshold being said difference exceeds said predefined threshold, said determining said final schedule includes applying a defensive action selection process that includes selecting and invoking a first action based on said first action being a least costly action of a plurality of candidate actions until a cumulative utility loss for continuing said first action exceeds a cost of invoking a next action, wherein said next action is a next least costly action of said plurality of candidate actions, and wherein said first action is included in said final schedule; and
   said computer system performing said plurality of actions according to said final schedule by employing first, second and third single action tools, wherein said plurality of actions includes a combination of said first single action tool throttling a server, said second single action tool throttling a network, and said third single action tool throttling a data storage device.

2. The method of claim 1, wherein said applying said recursive greedy pruning-lookback-lookforward process to construct and prune each tree of said plurality of trees includes:
   selecting m candidate actions based on said one or more candidate actions occurring in a time interval $[T_k, T_{k+1}]$ that specifies said sub-window, wherein m is greater than or equal to 1;
   adding m child nodes to m branches originating from a root of said tree, wherein said root specifies said time interval $[T_k, T_{k+1}]$, and wherein said m child nodes specify m candidate actions for improving said utility;
   pruning said m branches of said tree that include said m child nodes by selecting a child node of said m child nodes that specifies a candidate action (selected candidate action) of said m candidate actions, retaining said selected child node in said tree, and deleting from said tree (m−1) other child nodes of said m child nodes, wherein said selecting said child node is performed based on said candidate action having a lowest utility loss of m utility losses of said m candidate actions, and wherein said selecting said child node includes placing said candidate action in said final schedule;
   applying a look-back optimization process to said child node; and
   applying a look-forward optimization process to said child node.

3. The method of claim 2, wherein said applying said look-back optimization process to said child node includes:
   determining a set of one or more candidate actions that improve said utility, do not conflict with said selected candidate action, and occur in said sub-window and are completed before a finish time of said selected candidate action;
   adding said set of one or more candidate actions to one or more left branches originating from said selected node, wherein said one or more left branches include one or more left child nodes of said selected node that specify said set of one or more candidate actions;
   repeating said pruning, wherein said m branches are updated as said one or more left branches, said m child nodes are updated as said one or more left child nodes, said child node is updated as a left child node of said one or more left child nodes, said selected candidate action is updated as a candidate action of said set of one or more candidate actions specified by said left child node, and said m utility losses are updated to be one or more utility losses of said set of one or more candidate actions, wherein said repeating said pruning includes selecting said left child node that specifies said candidate action of said set of one or more candidate actions, retaining said selected left child node in said tree, and deleting from said tree other left child nodes of said one or more left child nodes, wherein said selecting said left child node is performed based on said candidate action of said set of one or more candidate actions having a lowest utility loss of said one or more utility losses of said set of one or more candidate actions, and wherein said selecting said left child node includes placing said candidate action of said set of one or more candidate actions in said final schedule;
   recursively applying said look-back optimization process to said selected left child node; and
   recursively applying said look-forward optimization process to said left child node.

4. The method of claim 2, wherein said applying said look-forward optimization process to said child node includes:
  determining a set of one or more candidate actions that improve said utility and occur in said sub-window and are started after a finish time of said selected candidate action;
  adding said set of one or more candidate actions to one or more right branches originating from said selected node, wherein said one or more right branches include one or more right child nodes of said selected node that specify said set of one or more candidate actions;
  repeating said pruning, wherein said m branches are updated as said one or more right branches, said m child nodes are updated as said one or more right child nodes, said child node is updated as a right child node of said one or more right child nodes, said selected candidate action is updated as a candidate action of said set of one or more candidate actions specified by said right child node, and said m utility losses are updated to be one or more utility losses of said set of one or more candidate actions, wherein said repeating said pruning includes selecting said right child node that specifies said candidate action of said set of one or more candidate actions, retaining said selected right child node in said tree, and deleting from said tree other right child nodes of said one or more right child nodes, wherein said selecting said right child node is performed based on said candidate action of said set of one or more candidate actions having a lowest utility loss of said one or more utility losses of said set of one or more candidate actions, and wherein said selecting said right child node includes placing said candidate action of said set of one or more candidate actions in said final schedule;
  recursively applying said look-back optimization process to said selected right child node; and
  recursively applying said look-forward optimization process to said right child node.

5. The method of claim 1, wherein said applying said defensive action selection process includes:
  selecting and invoking said first action based on a cost of said first action being a least cost of a plurality of costs of said plurality of candidate actions;
  updating said plurality of costs to an updated plurality of costs of said plurality of candidate actions, each cost of said updated plurality of costs based on a corresponding utility loss of a plurality of utility losses experienced if a corresponding candidate action of said plurality of candidate actions had been invoked instead of said first action;
  subsequent to said updating, determining a first cost of continuing said first action exceeds a second cost of said next action and said second cost is a least cost of said updated plurality of costs;
  responsive to said determining said first cost exceeds said second cost, stopping said first action and invoking said next action; and
  repeating said updating until a condition is true, wherein said condition is selected from the group consisting of:
    said second cost exceeds another cost of another action that is a least cost of said updated plurality of costs resulting from said repeating said updating;
    said data storage system returns to and remains in an acceptable state for a predefined period of time, wherein said acceptable state is a state in which throttling is not required as specified by predefined criteria; and
    another difference does not exceed said predefined threshold, wherein said another difference is based on a difference between another observed workload and another predicted workload, wherein said another observed workload is observed subsequent to said observed workload, and wherein said another predicted workload is predicted subsequent to said predicted workload.

6. The method of claim 5, further comprising: prior to said selecting and said invoking said first action, initializing said plurality of costs including an initial cost of an i-th action ($A_i$) of said second plurality of candidate actions, wherein said initializing includes determining said initial cost ($\text{Cost}(A_i)$) of said i-th action as a sum of a utility loss and a cost of hardware required for an invocation of said i-th action.

7. The method of claim 6, wherein said determining said initial cost ($\text{Cost}(A_i)$) of said i-th action includes solving an equation:

$$\text{Cost}(A_i) = \sum_{t=0}^{leadtime(A_i)} (U_{sys}(\text{no}_{action}, t) - U_{sys}(A_i\_\text{ongoing}, t)) + \text{HW\_Cost}(A_i),$$

wherein ($U_{sys}(\text{no}_{action},t)$ is a first value of said utility at a time t if no action is taken, and wherein $U_{sys}(A_i\_\text{ongoing},t)$ is a second value of said utility at said time t if $A_i$ is ongoing.

8. The method of claim 7, wherein said updating said plurality of costs includes updating said initial cost of said i-th action over T time intervals by solving a second equation:

$$\text{Updated Cost}(A_i) = \text{Cost}(A_i) + \sum_{j=0}^{T} UL(A_i, j),$$

wherein $$\sum_{j=0}^{T} UL(A_i, j)$$

is a utility loss caused by said i-th action $A_i$ over said T time intervals.

9. The method of claim 1, wherein said performing said plurality of actions according to said final schedule improves said utility by increasing a utility value:

$$\sum_{j=1}^{N} UF_j(Thru_j, Lat_j),$$

wherein N is a total number of workloads on said data storage system, wherein $UF_j$ is a utility function of workload j, wherein $Thru_j$ is a throughput of said $UF_j$, and wherein said $Lat_j$ is a latency of said $UF_j$.

10. The method of claim 1, further comprising:
  repeatedly updating said observed workload and said predicted workload;
  repeatedly updating a difference between said updated observed workload and said predicted workload;

determining whether or not said updated difference exceeds said predefined threshold; and transitioning between said normal mode and said unexpected mode in response to said determining whether or not said updated difference exceeds said predefined threshold.

11. A computer system comprising:

a processor; and a computer-readable memory unit coupled to said processor, said memory unit containing instructions executable by said processor to implement a method of throttling a plurality of operations of a plurality of applications that share a plurality of resources, said method comprising:

said computer system receiving an observed workload that is observed on a data storage system and a predicted workload that is predicted to be on said data storage system;

said computer system computing a difference between said observed workload and said predicted workload;

said computer system determining whether or not said difference exceeds a predefined threshold for distinguishing between a first mode (normal mode) of a multi-strategy finder and a second mode (unexpected mode) of said multi-strategy finder;

said computer system determining a final schedule of a plurality of actions that improve a utility of said data storage system, wherein, in response to a result of said determining whether or not said difference exceeds said predefined threshold being said difference does not exceed said predefined threshold, said determining said final schedule includes applying a recursive greedy pruning-lookback-lookforward process to construct and prune each tree of a plurality of trees, wherein a result of said recursive greedy pruning-lookback-lookforward process applied to a tree of said plurality of trees is a first set of one or more actions occurring in a sub-window of a window of time for improving said utility, and wherein said first set of one or more actions is included in said final schedule, wherein, in response to said result of said determining whether or not said difference exceeds said predefined threshold being said difference exceeds said predefined threshold, said determining said final schedule includes applying a defensive action selection process that includes selecting and invoking a first action based on said first action being a least costly action of a plurality of candidate actions until a cumulative utility loss for continuing said first action exceeds a cost of invoking a next action, wherein said next action is a next least costly action of said plurality of candidate actions, and wherein said first action is included in said final schedule; and said computer system performing said plurality of actions according to said final schedule by employing first, second and third single action tools, wherein said plurality of actions includes a combination of said first single action tool throttling a server, said second single action tool throttling a network, and said third single action tool throttling a data storage device.

12. The computer system of claim 11, wherein said applying said recursive greedy pruning-lookback-lookforward process to construct and prune each tree of said plurality of trees includes:

selecting m candidate actions based on said one or more candidate actions occurring in a time interval $[T_k, T_{k+1}]$ that specifies said sub-window, wherein m is greater than or equal to 1;

adding m child nodes to m branches originating from a root of said tree, wherein said root specifies said time interval $[T_k, T_{k+1}]$, and wherein said m child nodes specify m candidate actions for improving said utility;

pruning said m branches of said tree that include said m child nodes by selecting a child node of said m child nodes that specifies a candidate action (selected candidate action) of said m candidate actions, retaining said selected child node in said tree, and deleting from said tree (m−1) other child nodes of said m child nodes, wherein said selecting said child node is performed based on said candidate action having a lowest utility loss of m utility losses of said m candidate actions, and wherein said selecting said child node includes placing said candidate action in said final schedule;

applying a look-back optimization process to said child node; and applying a look-forward optimization process to said child node.

13. The computer system of claim 12, wherein said applying said look-back optimization process to said child node includes:

determining a set of one or more candidate actions that improve said utility, do not conflict with said selected candidate action, and occur in said sub-window and are completed before a finish time of said selected candidate action;

adding said set of one or more candidate actions to one or more left branches originating from said selected node, wherein said one or more left branches include one or more left child nodes of said selected node that specify said set of one or more candidate actions;

repeating said pruning, wherein said m branches are updated as said one or more left branches, said m child nodes are updated as said one or more left child nodes, said child node is updated as a left child node of said one or more left child nodes, said selected candidate action is updated as a candidate action of said set of one or more candidate actions specified by said left child node, and said m utility losses are updated to be one or more utility losses of said set of one or more candidate actions, wherein said repeating said pruning includes selecting said left child node that specifies said candidate action of said set of one or more candidate actions, retaining said selected left child node in said tree, and deleting from said tree other left child nodes of said one or more left child nodes, wherein said selecting said left child node is performed based on said candidate action of said set of one or more candidate actions having a lowest utility loss of said one or more utility losses of said set of one or more candidate actions, and wherein said selecting said left child node includes placing said candidate action of said set of one or more candidate actions in said final schedule;

recursively applying said look-back optimization process to said selected left child node; and recursively applying said look-forward optimization process to said left child node.

14. The computer system of claim 12, wherein said applying said look-forward optimization process to said child node includes:

determining a set of one or more candidate actions that improve said utility and occur in said sub-window and are started after a finish time of said selected candidate action;

adding said set of one or more candidate actions to one or more right branches originating from said selected node, wherein said one or more right branches include one or more right child nodes of said selected node that specify said set of one or more candidate actions;

repeating said pruning, wherein said m branches are updated as said one or more right branches, said m child nodes are updated as said one or more right child nodes, said child node is updated as a right child node of said one or more right child nodes, said selected candidate action is updated as a candidate action of said set of one or more candidate actions specified by said right child node, and said m utility losses are updated to be one or more utility losses of said set of one or more candidate actions, wherein said repeating said pruning includes selecting said right child node that specifies said candidate action of said set of one or more candidate actions, retaining said selected right child node in said tree, and deleting from said tree other right child nodes of said one or more right child nodes, wherein said selecting said right child node is performed based on said candidate action of said set of one or more candidate actions having a lowest utility loss of said one or more utility losses of said set of one or more candidate actions, and wherein said selecting said right child node includes placing said candidate action of said set of one or more candidate actions in said final schedule;

recursively applying said look-back optimization process to said selected right child node; and recursively applying said look-forward optimization process to said right child node.

15. The computer system of claim 11, wherein said applying said defensive action selection process includes:

selecting and invoking said first action based on a cost of said first action being a least cost of a plurality of costs of said plurality of candidate actions;

updating said plurality of costs to an updated plurality of costs of said plurality of candidate actions, each cost of said updated plurality of costs based on a corresponding utility loss of a plurality of utility losses experienced if a corresponding candidate action of said plurality of candidate actions had been invoked instead of said first action;

subsequent to said updating, determining a first cost of continuing said first action exceeds a second cost of said next action and said second cost is a least cost of said updated plurality of costs;

responsive to said determining said first cost exceeds said second cost, stopping said first action and invoking said next action; and repeating said updating until a condition is true, wherein said condition is selected from the group consisting of:

said second cost exceeds another cost of another action that is a least cost of said updated plurality of costs resulting from said repeating said updating;

said data storage system returns to and remains in an acceptable state for a predefined period of time, wherein said acceptable state is a state in which throttling is not required as specified by predefined criteria; and another difference does not exceed said predefined threshold, wherein said another difference is based on a difference between another observed workload and another predicted workload, wherein said another observed workload is observed subsequent to said observed workload, and wherein said another predicted workload is predicted subsequent to said predicted workload.

16. The computer system of claim 15, wherein said method further comprises: prior to said selecting and said invoking said first action, initializing said plurality of costs including an initial cost of an i-th action ($A_i$) of said second plurality of candidate actions, wherein said initializing includes determining said initial cost ($Cost(A_i)$) of said i-th action as a sum of a utility loss and a cost of hardware required for an invocation of said i-th action.

17. The computer system of claim 16, wherein said determining said initial cost ($Cost(A_i)$) of said i-th action includes solving an equation:

$$Cost(A_i) = \sum_{t=0}^{leadtime(A_i)} (U_{sys}(no_{action}, t) - U_{sys}(A_i\_ongoing, t)) + HW\_Cost(A_i),$$

wherein ($U_{sys}(no_{action},t)$ is a first value of said utility at a time t if no action is taken, and wherein $U_{sys}(A_i\_ongoing,t)$ is a second value of said utility at said time t if $A_i$ is ongoing.

18. The computer system of claim 17, wherein said updating said plurality of costs includes updating said initial cost of said i-th action over T time intervals by solving a second equation:

$$\text{Updated } Cost(A_i) = Cost(A_i) + \sum_{j=0}^{T} UL(A_i, j),$$

wherein $$\sum_{j=0}^{T} UL(A_i, j)$$

is a utility loss caused by said i-th action $A_i$ over said T time intervals.

19. The computer system of claim 11, wherein said performing said plurality of actions according to said final schedule improves said utility by increasing a utility value:

$$\sum_{j=1}^{N} UF_j(Thru_j, Lat_j),$$

wherein N is a total number of workloads on said data storage system, wherein $UF_j$ is a utility function of workload j, wherein $Thru_j$ is a throughput of said $UF_j$, and wherein said $Lat_j$ is a latency of said $UF_j$.

20. A computer program product, comprising:

a computer readable storage medium having a computer readable program code stored therein, said computer readable storage medium not being a transitory signal medium, said computer readable program code containing instructions executable by a processor of a computer system to implement a method of throttling a plurality of operations of a plurality of applications that share a plurality of resources, said method comprising:

said computer system receiving an observed workload that is observed on a data storage system and a predicted workload that is predicted to be on said data storage system;

said computer system computing a difference between said observed workload and said predicted workload;

said computer system determining whether or not said difference exceeds a predefined threshold for distinguishing between a first mode (normal mode) of a multi-strategy finder and a second mode (unexpected mode) of said multi-strategy finder;

said computer system determining a final schedule of a plurality of actions that improve a utility of said data storage system, wherein, in response to a result of said determining whether or not said difference exceeds said predefined threshold being said difference does not exceed said predefined threshold, said determining said final schedule includes applying a recursive greedy pruning-lookback-lookforward process to construct and prune each tree of a plurality of trees, wherein a result of said recursive greedy pruning-lookback-lookforward process applied to a tree of said plurality of trees is a first set of one or more actions occurring in a sub-window of a window of time for improving said utility, and wherein said first set of one or more actions is included in said final schedule, wherein, in response to said result of said determining whether or not said difference exceeds said predefined threshold being said difference exceeds said predefined threshold, said determining said final schedule includes applying a defensive action selection process that includes selecting and invoking a first action based on said first action being a least costly action of a plurality of candidate actions until a cumulative utility loss for continuing said first action exceeds a cost of invoking a next action, wherein said next action is a next least costly action of said plurality of candidate actions, and wherein said first action is included in said final schedule; and said computer system performing said plurality of actions according to said final schedule by employing first, second and third single action tools, wherein said plurality of actions includes a combination of said first single action tool throttling a server, said second single action tool throttling a network, and said third single action tool throttling a data storage device.

21. The program product of claim 20, wherein said applying said recursive greedy pruning-lookback-lookforward process to construct and prune each tree of said plurality of trees includes:

selecting m candidate actions based on said one or more candidate actions occurring in a time interval $[T_k, T_{k+1}]$ that specifies said sub-window, wherein m is greater than or equal to 1;

adding m child nodes to m branches originating from a root of said tree, wherein said root specifies said time interval $[T_k, T_{k+1}]$, and wherein said m child nodes specify m candidate actions for improving said utility;

pruning said m branches of said tree that include said m child nodes by selecting a child node of said m child nodes that specifies a candidate action (selected candidate action) of said m candidate actions, retaining said selected child node in said tree, and deleting from said tree (m−1) other child nodes of said m child nodes, wherein said selecting said child node is performed based on said candidate action having a lowest utility loss of m utility losses of said m candidate actions, and wherein said selecting said child node includes placing said candidate action in said final schedule;

applying a look-back optimization process to said child node; and applying a look-forward optimization process to said child node.

22. The program product of claim 21, wherein said applying said look-back optimization process to said child node includes:

determining a set of one or more candidate actions that improve said utility, do not conflict with said selected candidate action, and occur in said sub-window and are completed before a finish time of said selected candidate action;

adding said set of one or more candidate actions to one or more left branches originating from said selected node, wherein said one or more left branches include one or more left child nodes of said selected node that specify said set of one or more candidate actions;

repeating said pruning, wherein said m branches are updated as said one or more left branches, said m child nodes are updated as said one or more left child nodes, said child node is updated as a left child node of said one or more left child nodes, said selected candidate action is updated as a candidate action of said set of one or more candidate actions specified by said left child node, and said m utility losses are updated to be one or more utility losses of said set of one or more candidate actions, wherein said repeating said pruning includes selecting said left child node that specifies said candidate action of said set of one or more candidate actions, retaining said selected left child node in said tree, and deleting from said tree other left child nodes of said one or more left child nodes, wherein said selecting said left child node is performed based on said candidate action of said set of one or more candidate actions having a lowest utility loss of said one or more utility losses of said set of one or more candidate actions, and wherein said selecting said left child node includes placing said candidate action of said set of one or more candidate actions in said final schedule;

recursively applying said look-back optimization process to said selected left child node; and recursively applying said look-forward optimization process to said left child node.

23. The program product of claim 21, wherein said applying said look-forward optimization process to said child node includes:

determining a set of one or more candidate actions that improve said utility and occur in said sub-window and are started after a finish time of said selected candidate action;

adding said set of one or more candidate actions to one or more right branches originating from said selected node, wherein said one or more right branches include one or more right child nodes of said selected node that specify said set of one or more candidate actions;

repeating said pruning, wherein said m branches are updated as said one or more right branches, said m child nodes are updated as said one or more right child nodes, said child node is updated as a right child node of said one or more right child nodes, said selected candidate action is updated as a candidate action of said set of one or more candidate actions specified by said right child node, and said m utility losses are updated to be one or more utility losses of said set of one or more candidate actions, wherein said repeating said pruning includes selecting said right child node that specifies said candidate action of said set of one or more candidate actions, retaining said selected right child node in said tree, and deleting from said tree other right child nodes of said one or more right child nodes, wherein said selecting said right child node is performed based on said candidate action of said set of one or more candidate actions having a lowest utility loss of said one or more utility losses of said set of one or more candidate actions, and wherein said selecting said right child node includes placing said candidate action of said set of one or more candidate actions in said final schedule;

recursively applying said look-back optimization process to said selected right child node; and recursively applying said look-forward optimization process to said right child node.

24. The program product of claim 20, wherein said applying said defensive action selection process includes:

selecting and invoking said first action based on a cost of said first action being a least cost of a plurality of costs of said plurality of candidate actions;

updating said plurality of costs to an updated plurality of costs of said plurality of candidate actions, each cost of said updated plurality of costs based on a corresponding utility loss of a plurality of utility losses experienced if a corresponding candidate action of said plurality of candidate actions had been invoked instead of said first action;

subsequent to said updating, determining a first cost of continuing said first action exceeds a second cost of said next action and said second cost is a least cost of said updated plurality of costs;

responsive to said determining said first cost exceeds said second cost, stopping said first action and invoking said next action; and repeating said updating until a condition is true, wherein said condition is selected from the group consisting of:
  said second cost exceeds another cost of another action that is a least cost of said updated plurality of costs resulting from said repeating said updating;
  said data storage system returns to and remains in an acceptable state for a predefined period of time, wherein said acceptable state is a state in which throttling is not required as specified by predefined criteria; and
  another difference does not exceed said predefined threshold, wherein said another difference is based on a difference between another observed workload and another predicted workload, wherein said another observed workload is observed subsequent to said observed workload, and wherein said another predicted workload is predicted subsequent to said predicted workload.

25. The program product of claim 24, wherein said method further comprises: prior to said selecting and said invoking said first action, initializing said plurality of costs including an initial cost of an i-th action ($A_i$) of said second plurality of candidate actions, wherein said initializing includes determining said initial cost ($Cost(A_i)$) of said i-th action as a sum of a utility loss and a cost of hardware required for an invocation of said i-th action.

26. A process for supporting computing infrastructure, said process comprising providing at least one support service for at least one of creating, integrating, hosting, maintaining, and deploying computer-readable code in a computer system, wherein the code in combination with the computer system is capable of performing a method of throttling a plurality of operations of a plurality of applications that share a plurality of resources, said method comprising:

said computer system receiving an observed workload that is observed on a data storage system and a predicted workload that is predicted to be on said data storage system;

said computer system computing a difference between said observed workload and said predicted workload;

said computer system determining whether or not said difference exceeds a predefined threshold for distinguishing between a first mode (normal mode) of a multi-strategy finder and a second mode (unexpected mode) of said multi-strategy finder;

said computer system determining a final schedule of one or more actions that improve a utility of said data storage system, wherein, in response to a result of said determining whether or not said difference exceeds said predefined threshold being said difference does not exceed said predefined threshold, said determining said final schedule includes applying a recursive greedy pruning-lookback-lookforward process to construct and prune each tree of a plurality of trees, wherein a result of said recursive greedy pruning-lookback-lookforward process applied to a tree of said plurality of trees is a first set of one or more actions occurring in a sub-window of a window of time for improving said utility, and wherein said first set of one or more actions is included in said final schedule, wherein, in response to said result of said determining whether or not said difference exceeds said predefined threshold being said difference exceeds said predefined threshold, said determining said final schedule includes applying a defensive action selection process that includes selecting and invoking a first action based on said first action being a least costly action of a plurality of candidate actions until a cumulative utility loss for continuing said first action exceeds a cost of invoking a next action, wherein said next action is a next least costly action of said plurality of candidate actions, and wherein said first action is included in said final schedule; and said computer system performing said plurality of actions according to said final schedule by employing first, second and third single action tools, wherein said plurality of actions includes a combination of said first single action tool throttling a server, said second single action tool throttling a network, and said third single action tool throttling a data storage device.

27. The process of claim 26, wherein said applying said recursive greedy pruning-lookback-lookforward process to construct and prune each tree of said plurality of trees includes:

selecting m candidate actions based on said one or more candidate actions occurring in a time interval [$T_k$, $T_{k+1}$] that specifies said sub-window, wherein m is greater than or equal to 1;

adding m child nodes to m branches originating from a root of said tree, wherein said root specifies said time interval [$T_k$, $T_{k+1}$], and wherein said m child nodes specify m candidate actions for improving said utility;

pruning said m branches of said tree that include said m child nodes by selecting a child node of said m child nodes that specifies a candidate action (selected candidate action) of said m candidate actions, retaining said selected child node in said tree, and deleting from said tree (m−1) other child nodes of said m child nodes, wherein said selecting said child node is performed based on said candidate action having a lowest utility loss of m utility losses of said m candidate actions, and wherein said selecting said child node includes placing said candidate action in said final schedule;

applying a look-back optimization process to said child node; and applying a look-forward optimization process to said child node.

28. The process of claim 27, wherein said applying said look-back optimization process to said child node includes:

determining a set of one or more candidate actions that improve said utility, do not conflict with said selected candidate action, and occur in said sub-window and are completed before a finish time of said selected candidate action;

adding said set of one or more candidate actions to one or more left branches originating from said selected node, wherein said one or more left branches include one or more left child nodes of said selected node that specify said set of one or more candidate actions;

repeating said pruning, wherein said m branches are updated as said one or more left branches, said m child nodes are updated as said one or more left child nodes, said child node is updated as a left child node of said one or more left child nodes, said selected candidate action is updated as a candidate action of said set of one or more candidate actions specified by said left child node, and said m utility losses are updated to be one or more utility losses of said set of one or more candidate actions, wherein said repeating said pruning includes selecting said left child node that specifies said candidate action of said set of one or more candidate actions, retaining said selected left child node in said tree, and deleting from said tree other left child nodes of said one or more left child nodes, wherein said selecting said left child node is performed based on said candidate action of said set of one or more candidate actions having a lowest utility loss of said one or more utility losses of said set of one or more candidate actions, and wherein said selecting said left child node includes placing said candidate action of said set of one or more candidate actions in said final schedule;

recursively applying said look-back optimization process to said selected left child node; and recursively applying said look-forward optimization process to said left child node.

29. The process of claim 27, wherein said applying said look-forward optimization process to said child node includes:

determining a set of one or more candidate actions that improve said utility and occur in said sub-window and are started after a finish time of said selected candidate action;

adding said set of one or more candidate actions to one or more right branches originating from said selected node, wherein said one or more right branches include one or more right child nodes of said selected node that specify said set of one or more candidate actions;

repeating said pruning, wherein said m branches are updated as said one or more right branches, said m child nodes are updated as said one or more right child nodes, said child node is updated as a right child node of said one or more right child nodes, said selected candidate action is updated as a candidate action of said set of one or more candidate actions specified by said right child node, and said m utility losses are updated to be one or more utility losses of said set of one or more candidate actions, wherein said repeating said pruning includes selecting said right child node that specifies said candidate action of said set of one or more candidate actions, retaining said selected right child node in said tree, and deleting from said tree other right child nodes of said one or more right child nodes, wherein said selecting said right child node is performed based on said candidate action of said set of one or more candidate actions having a lowest utility loss of said one or more utility losses of said set of one or more candidate actions, and wherein said selecting said right child node includes placing said candidate action of said set of one or more candidate actions in said final schedule;

recursively applying said look-back optimization process to said selected right child node; and recursively applying said look-forward optimization process to said right child node.

* * * * *